(12) United States Patent  (10) Patent No.: US 6,595,141 B2
Ishikawa et al.  (45) Date of Patent: Jul. 22, 2003

(54) TRUCK TRANSPORT APPARATUS

(75) Inventors: Shinji Ishikawa, Osaka (JP); Heihachi Kobayashi, Osaka (JP)

(73) Assignee: Nakanishi Metal Works Co., Ltd, Osaka (JP)

( * ) Notice: Subject to any disclaimer, the term of this patent is extended or adjusted under 35 U.S.C. 154(b) by 6 days.

(21) Appl. No.: 09/824,857

(22) Filed: Apr. 4, 2001

(65) Prior Publication Data

US 2001/0017094 A1 Aug. 30, 2001

Related U.S. Application Data

(63) Continuation-in-part of application No. 09/287,266, filed on Apr. 7, 1999, now abandoned.

(30) Foreign Application Priority Data

Apr. 9, 1998 (JP) ................................. 10/97029
Dec. 21, 1998 (JP) ........................... 10/362185

(51) Int. Cl.[7] .............................................. B65G 35/06
(52) U.S. Cl. ...................... 104/163; 104/168; 213/62 R
(58) Field of Search ................... 104/139, 163, 104/168, 138.2; 213/62 R, 8

(56) References Cited

U.S. PATENT DOCUMENTS 3,412,690 A   11/1968  Broggie et al. ............. 104/168
3,854,596 A * 12/1974 Stephenson et al. ........... 213/8
3,907,121 A *  9/1975 Carle et al. ...................... 213/8
4,064,998 A * 12/1977 Dilg et al. ................. 213/62 R
5,067,413 A   11/1991 Kiuchi et al. ................ 104/168
5,421,267 A    6/1995 Mesko et al. ................ 104/168

FOREIGN PATENT DOCUMENTS

EP    0597416    5/1994
JP    7-25440    1/1995

* cited by examiner

*Primary Examiner*—Kathy Matecki
*Assistant Examiner*—Sang Kim
(74) *Attorney, Agent, or Firm*—Armstrong, Westerman & Hattori, LLP

(57) ABSTRACT

A truck transport apparatus comprises a trolley running rail 11, a front trolley 32 and a rear trolley 33 arranged along the rail 11 in a truck running direction, a truck body 35 connected to the front trolley 32 and the rear trolley 33 at a lengthwise intermediate portion of each trolley so as to permit each trolley to pivotally move horizontally, a driven rod 38 having a front end connected to a rear end of the front trolley 32 so as to make the front trolley 32 free to pivotally move horizontally and a rear end connected to a front end of the rear trolley 33 so as to make the rear trolley 33 free to pivotally move horizontally, and a pair of transport rollers 84, 87 for holding the driven rod 38 therebetween from opposite sides thereof to give the rod a propelling force. The driven rod 38 is extended when the truck is about to move into a curved path of movement from a straight path of movement, while the rod 38 is contracted when the truck is about to move into the straight path from the curved path.

19 Claims, 24 Drawing Sheets

TRUCK TRANSPORT APPARATUS

This application is a continuation-in-part of application Ser. No. 09/287,266 filed on Apr. 7, 1999 now abandoned.

BACKGROUND OF THE INVENTION

The present invention relates to truck transport apparatus, for example, for use in automobile plants for transporting vehicle bodies as placed on trucks along a specified path.

As disclosed, for example, in JP-A No. 7-25440 (1995), apparatus of the type mentioned are already known.

With reference to FIGS. 22 and 23, the conventional apparatus comprises a trolley running rail (not shown), a front trolley 301 and a rear trolley (not shown) arranged along the rail in a truck running direction, a truck body 311 connected to the front trolley 301 and the rear trolley at a lengthwise intermediate portion of each trolley so as to permit each trolley to pivotally move horizontally, a driven rod 321 having a front end connected to the front trolley 301 and a rear end connected to the rear trolley, and a pair of transport rollers (not shown) arranged respectively at opposite sides of a straight path of movement of trucks for holding the driven rod 321 therebetween from opposite sides thereof to give the rod a propelling force, the driven rod 321 being connected to the vehicle body 311.

With the conventional apparatus described, the transport rollers are provided only for the straight path of movement of trucks, and are not provided for curved path of movement. Accordingly, when the truck is to be traveled along the curved path, trucks are connected together or disconnected as desired so as to push the truck on the curved path by the following truck or trucks or to draw the truck thereon by a preceding truck or trucks.

To obviates such a troublesome procedure, it is desirable to provide transport rollers also for the curved path, whereas the following problems then need to be overcome.

When a truck is about to move into the curved path, the lengthwise intermediate portion of the driven rod moves radially inwardly of the curved path. The transport rollers are therefore shifted toward or away from the curved path. The greater the amount of shift, the greater the degree is to which the smooth travel of the truck is impaired.

Since the driven rod 321 is connected to the truck body 311 in the case of the conventional apparatus, the amount of shift of the driven rod 321 becomes inevitably great.

The conventional apparatus further includes another driven rod 331 having a front end connected to a head trolley (not shown) preceding the front trolley 301 and a rear end connected to the front end of the driven rod 321.

When the driven rod 321 following the driven rod 331 is to move past the transport rollers, the two driven rods 331, 321 make an angle θ therebetween. The smaller this angle θ, the markedly greater the amount of shift of the transport rollers. The truck therefore fails to move past the transport rollers smoothly.

When the preceding driven rod 331 is forwarded by the transport rollers in the conventional apparatus, the following driven rod 321 is immediately advanced to the location of the transport rollers, so that the transport rollers shift abruptly greatly.

SUMMARY OF THE INVENTION

An object of the present invention is to overcome the foregoing problems and to provide a truck transport apparatus which enables trucks to travel smoothly.

The present invention provides an apparatus for transporting trucks which comprises a trolley running rail, a front trolley and a rear trolley arranged along the rail in a truck running direction, a truck body connected to the front trolley and the rear trolley at a lengthwise intermediate portion of each trolley so as to permit each trolley to pivotally move horizontally, a driven rod having a front end connected to a rear end of the front trolley so as to make the front trolley free to pivotally move horizontally and a rear end connected to a front end of the rear trolley so as to make the rear trolley free to pivotally move horizontally, and a pair of transport rollers for holding the driven rod therebetween from opposite sides thereof to give the rod a propelling force, the rail having a straight path of movement and a curved path of movement, the driven rod being extensible when the truck is about to move into the curved path from the straight path and contractable when the truck is about to move into the straight path from the curved path.

When the truck of the transport apparatus of the invention is about to advance into the curved path of movement, the front trolley and the rear trolley are horizontally moved and flexed relative to the driven rod by the extension of the rod, whereby the driven rod is positioned outwardly of a line through the lengthwise midpoints of the front and rear trolleys by an amount corresponding to the flexure of the front and rear trolleys. This means that the shift of the transport rollers in the radial direction of the curved path diminishes, permitting the truck to travel smoothly.

Preferably, the apparatus has the following feature. The rail comprises a pair of guide members extending longitudinally of the rail and opposed to each other as horizontally spaced apart by a predetermined distance, and a horizontal front guide roller and a horizontal rear guide roller are mounted respectively on front and rear portions of each of the trolleys and held between the guide members, the connection between the front trolley rear end and the driven rod front end having a pivotal center in coincidence with the center of rotation of the rear guide roller of the front trolley, the connection between the rear trolley front end and the driven rod rear end having a pivotal center in coincidence with the center of rotation of the front guide roller of the rear trolley.

When the trolleys move past the transport rollers, it is likely that the transport roller will push the approximate pivotal center of the connection sideways outward, causing the front guide roller to contact the outer guide member. Even in such a case, the trolley is unlikely to move pivotally since no principle of the lever and fulcrum works. Accordingly, there is no likelihood that the front and rear guide rollers will collide with the guide member repeatedly, hence no noise. The trolleys therefore travel with improved smoothness.

A preceding driven rod connected at a front end thereof to a head trolley preceding the front trolley has a rear end connected to a front end of the front trolley so as to make the front trolley free to pivotally move horizontally, and a following driven rod connected at a rear end thereof to a tail trolley following the rear trolley has a front end connected to a rear end of the rear trolley so as to make the rear trolley free to pivotally move horizontally, the connection between the front trolley front end and the preceding driven rod rear end having a pivotal center in coincidence with the center of rotation of the front guide roller of the front trolley, the connection between the rear trolley rear end and the following driven rod front end having a pivotal center in coincidence with the center of rotation of the rear guide roller of the rear trolley, the preceding driven rod and the following driven rod each having opposite side faces joined to respective side faces of the first-mentioned driven rod so as to be flush therewith. Like the driven rod, the preceding and following driven rods can then be smoothly moved past the transport rollers.

When the head trolley is provided at the front end thereof with a head member having a front end face with a generally V-shaped contour in horizontal section, the head member mitigates the impact to be produced when the head trolley advances into contact with the transport rollers.

When comprising a telescopic pipe, the first-mentioned driven rod can be extended or contracted by a simple structure.

The rail has a curved path of movement, and the pair of transport rollers are arranged on opposite sides of the curved path and supported by a horizontal pivotal body so as to be movable together. This enables the truck to travel the curved path by itself.

The pair of transport rollers are a drive roller positioned on one side of the curved path and a holding roller positioned on the other side thereof, and the pivotal body comprises a main pivotal arm having the drive roller mounted on a forward end thereof, a support arm fixed at a base end thereof to a lengthwise intermediate portion of the main pivotal arm and extending across the curved path therebelow, and a driven pivotal arm carrying the holding roller at a forward end thereof and pivoted at a base end thereof to a free end of the support arm so as to be horizontally movable relative to the support arm.

A vertical outer square pipe is secured to a base end of the main pivotal arm, and a vertical inner square pipe is fitted in the outer square pipe so as to be horizontally movable, the outer pipe being packed with an elastic material around the inner pipe so that the diagonals of one of the pipes are displaced from those of the other pipe by 45 degrees. An elastic force for pressing the drive roller against the rail can then be given to the main pivotal arm by a simple arrangement.

Preferably, a spring is attached to and extends between the support arm and the driven pivotal arm for biasing the driven arm in a direction to move the holding roller toward the drive roller.

Furthermore, other truck transport apparatus are defined in appended claims 10 to 18. Use of the structures thus claimed enables the truck to travel the curved path by itself, with the driven rod not necessarily extended or contracted.

DESCRIPTION OF THE PREFERRED EMBODIMENTS

Embodiments of the invention will be described below with reference to the drawings.

In the following description, the term "front" refers to the direction (indicated by the arrow A in FIG. 1) in which the truck advances, the term "rear" to the opposite direction, and the terms "left" and "right" are used for the conveyor as it is viewed from the front.

Figure 1:
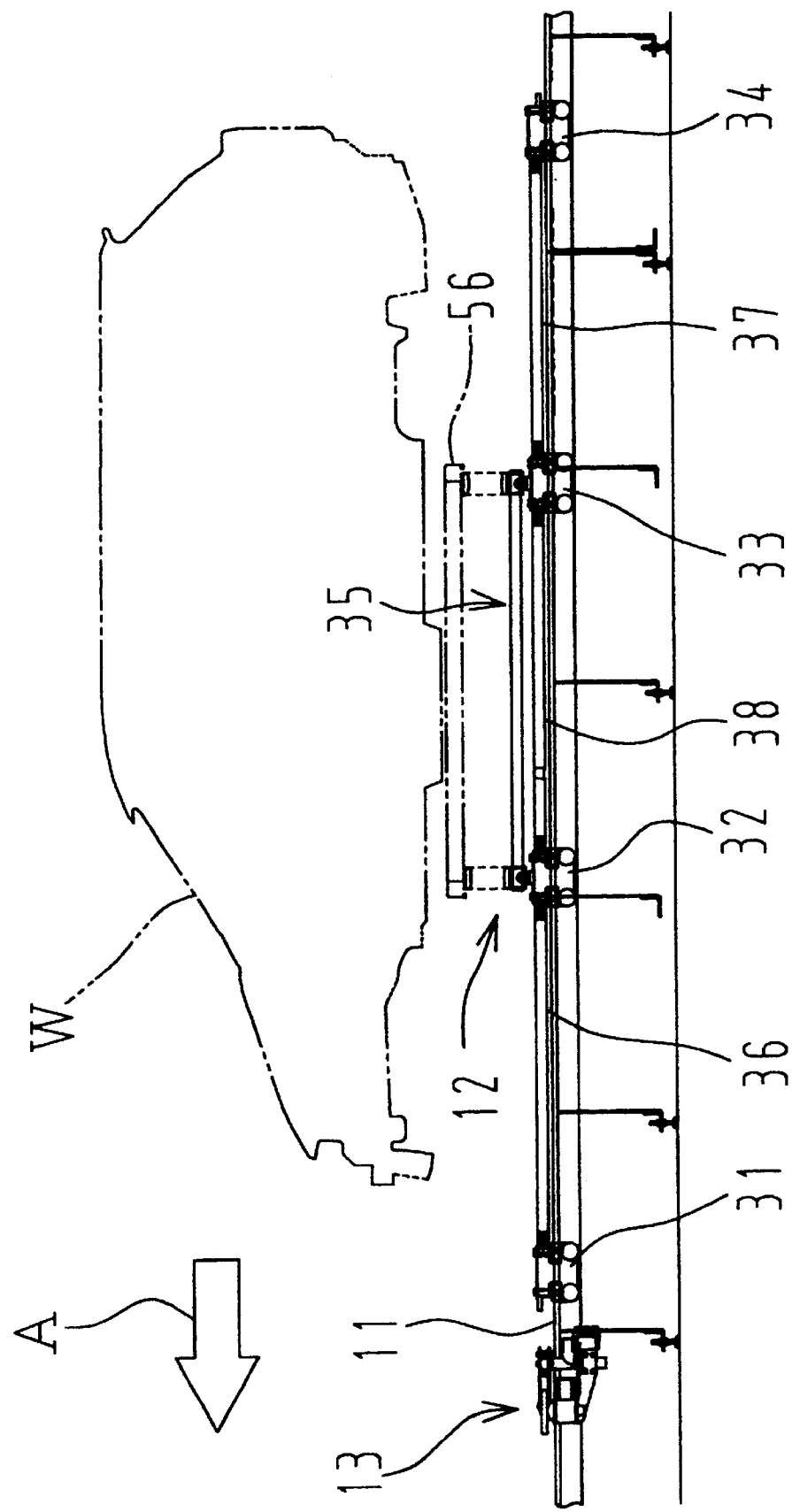
FIG. 1 is a side elevation of a trolley conveyor embodying the invention.
Figure 2:
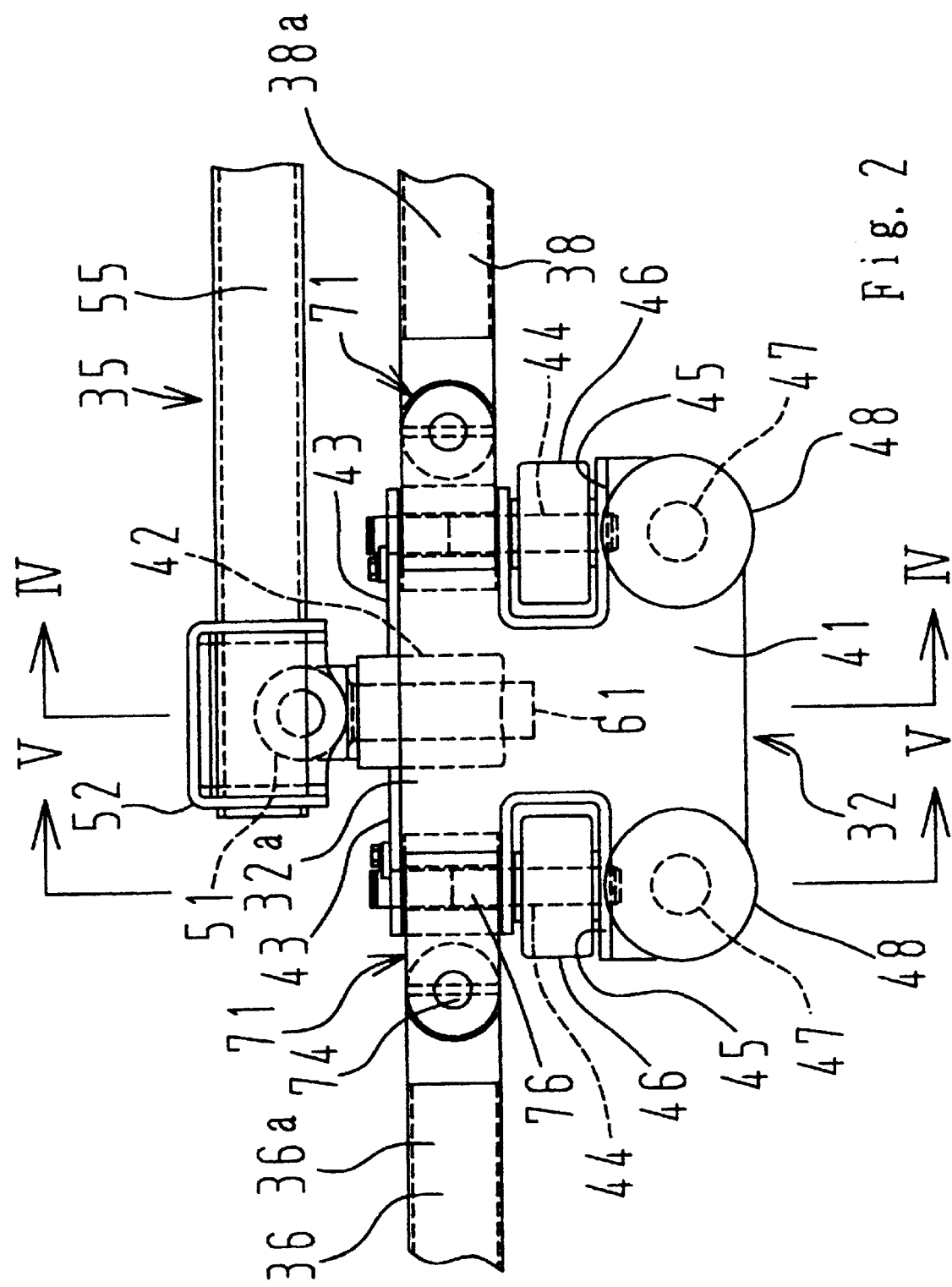
FIG. 2 is a side elevation showing a second trolley of the conveyor and the surroundings thereof.
Figure 3:
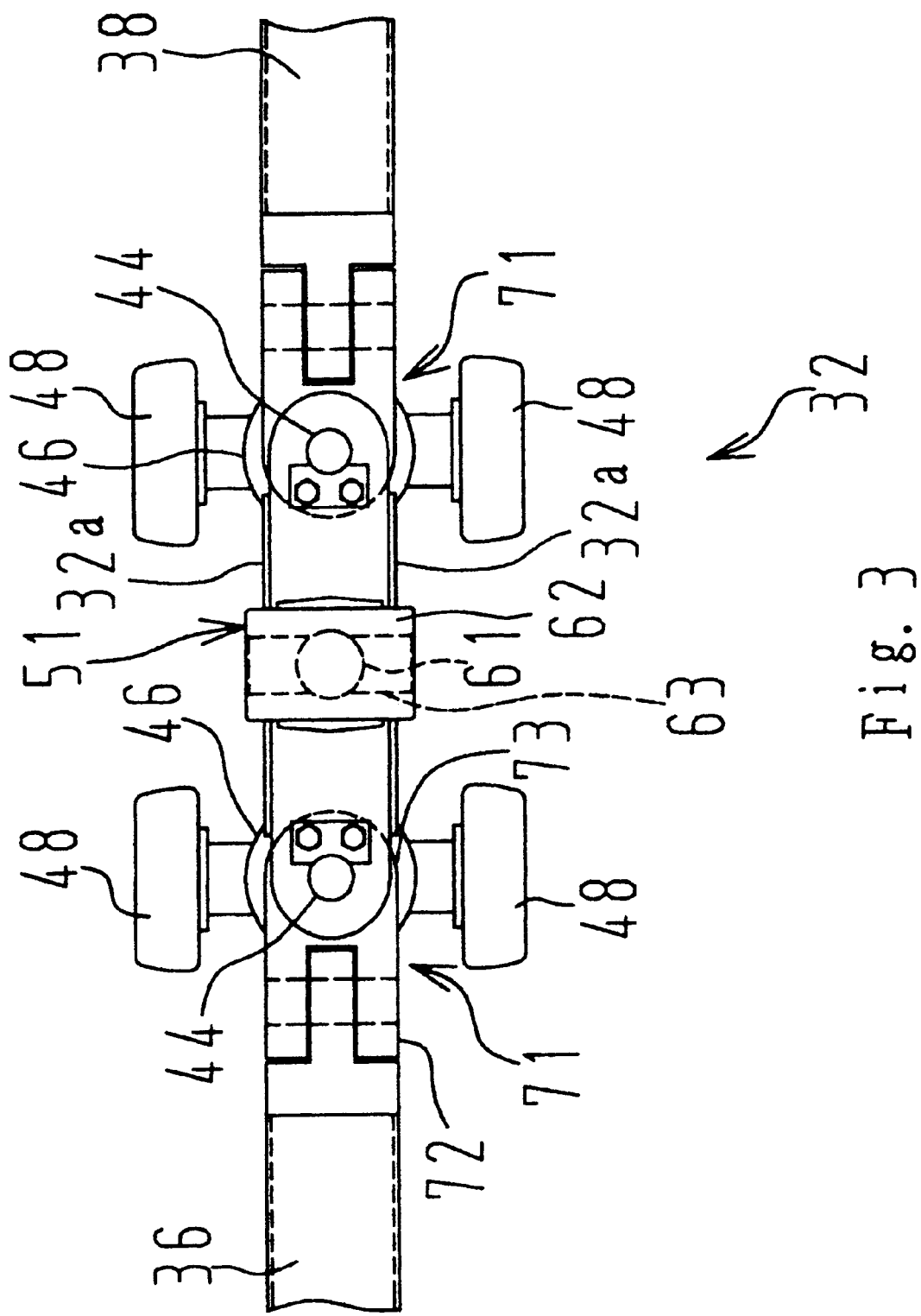
FIG. 3 is a plan view of the same.

FIG. 1 shows a truck running rail 11, a truck 12 and a truck drive device 13 for moving the truck 12 along the rail 11. Although FIG. 1 shows only one truck drive device 13, a plurality of drive devices 13 are arranged along a path of movement of trucks at an interval slightly smaller than the entire length of the truck 12.

Figure 4:
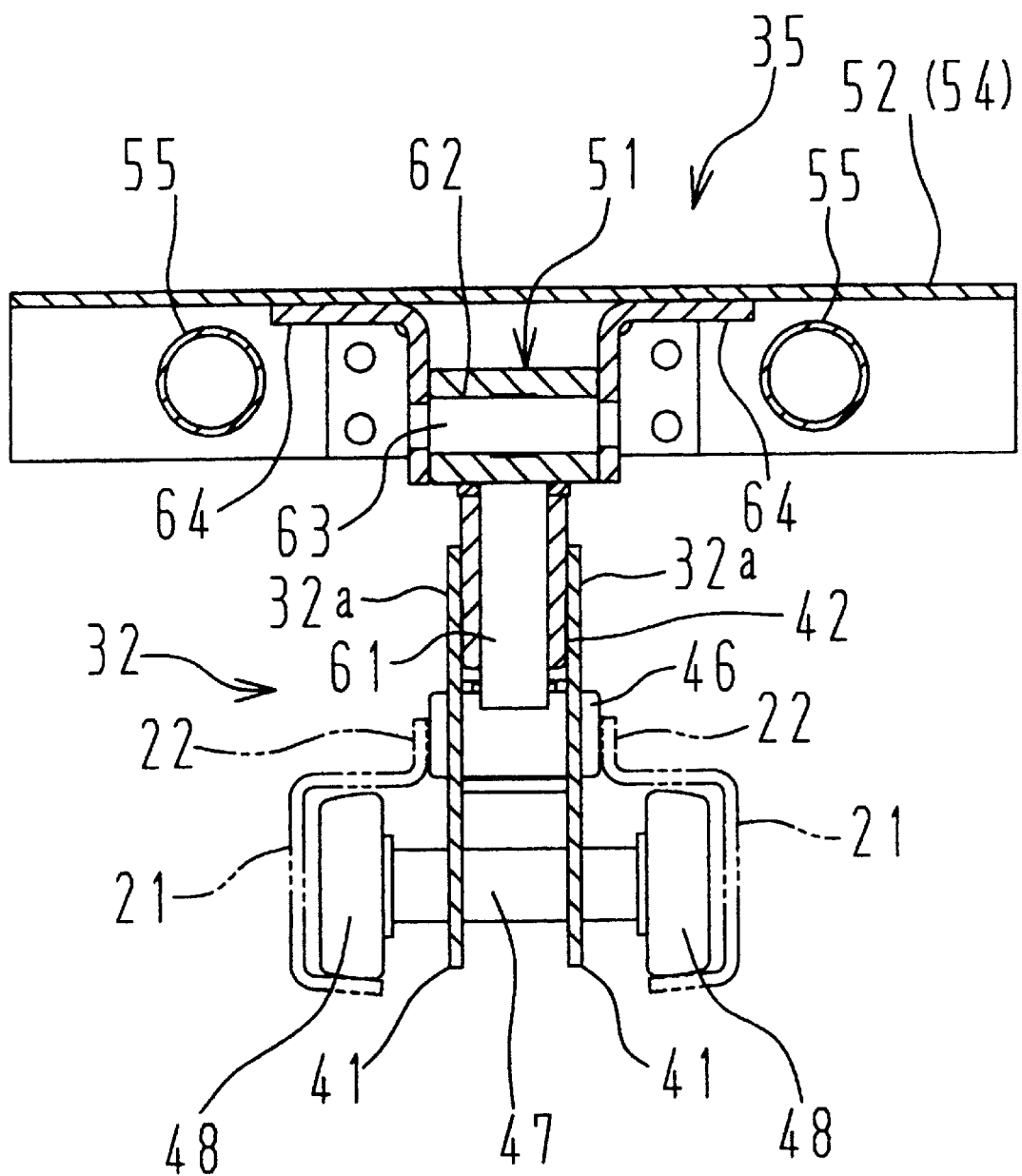
FIG. 4 is a view in cross section taken vertically along the line IV—IV in FIG. 2.
Figure 5:
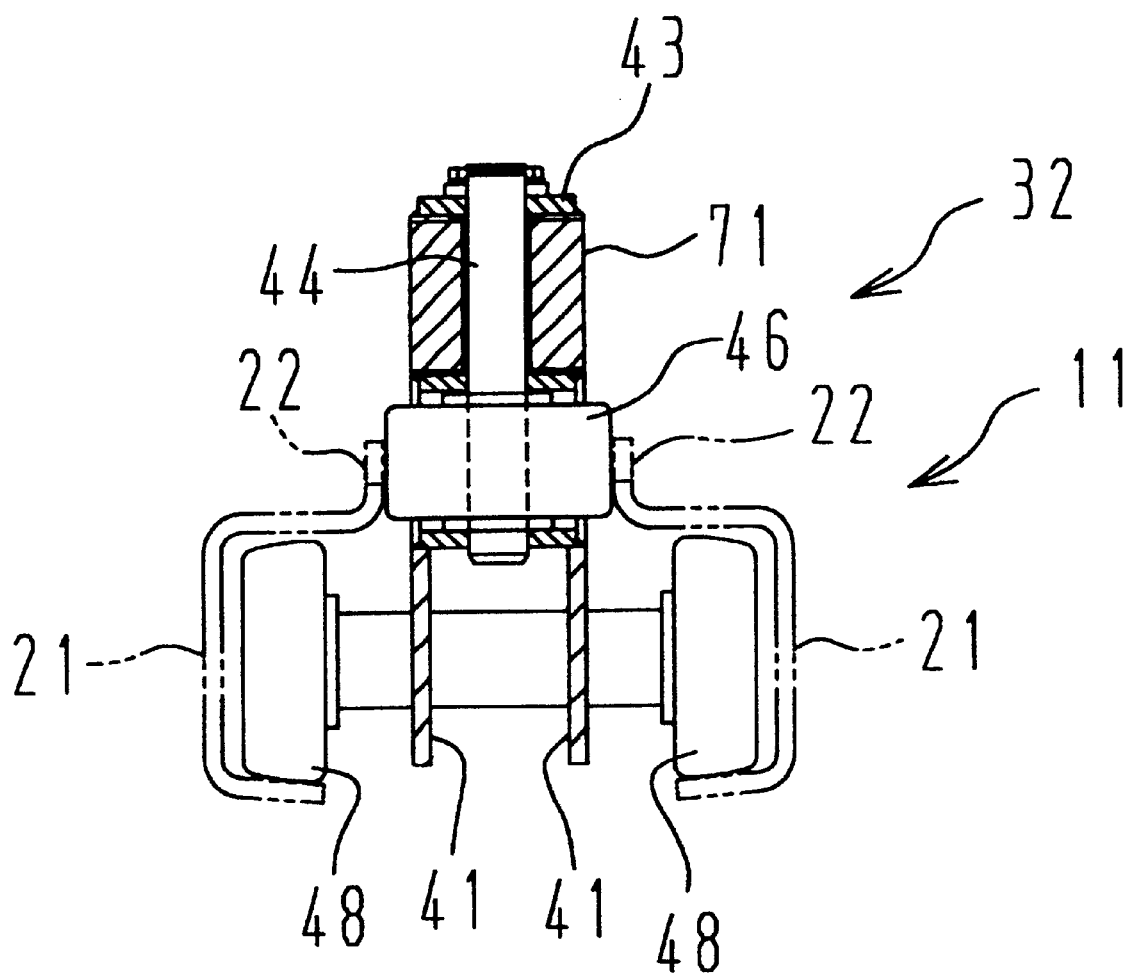
FIG. 5 is a view in cross section taken vertically along the line V—V in FIG. 2.

As shown in detail in FIGS. 4 and 5, the rail 11 comprises a pair of rail members 21 each in the form of a channel. The rail members 21 are spaced apart by a predetermined distance with their openings opposed to each other. The opposed edges of upper flanges of the rail members 21 are bent upward as at 22.

With reference to FIG. 1 again, the truck 12 comprises first to fourth trolleys 31 to 34 arranged on the rail 11 from the front rearward, a truck body 35 extending from the second trolley 32 to the third trolley 33, a first driven rod 36 connected between the first and second trolleys 31, 32, and a second driven rod 37 connected between the third and fourth trolleys 33, 34. The second and third trolleys 32, 33 are interconnected by a third driven rod 38 positioned below the truck body 35. The article W to be transported is placed on the truck body 35.

The first and fourth trolleys 31, 34 are of the same construction, and the second and third trolleys 32, 33 are of the same construction. While the first and fourth trolleys 31, 34 will be described later, the second trolley 32 shown in FIGS. 2 to 5 will be described as the typical of the second and third trolleys 32, 33.

The second trolley 32 has a pair of left and right vertical side plates 41 arranged at a predetermined spacing as opposed to each other, and a horizontal top plate 43.

A vertical guide sleeve 42 is held between the upper portions of the opposed side plates 41 at their lengthwise midportions. Front and rear yokes 45, channel-shaped when seen from one side, are fitted respectively in the front and rear ends of the side plates 41 at the midportion of the height thereof. Front and rear vertical roller shafts 44 are provided so as to extend through the respective front and rear end portions of the top plate 43 and through upper and lower flanges of the respective front and rear yokes 45. The vertical roller shafts 44 have front and rear connecting members 71 each attached to an upper portion of the shaft, and front and rear horizontal guide rollers 46 each attached to a lower portion of the shaft.

Figure 6:
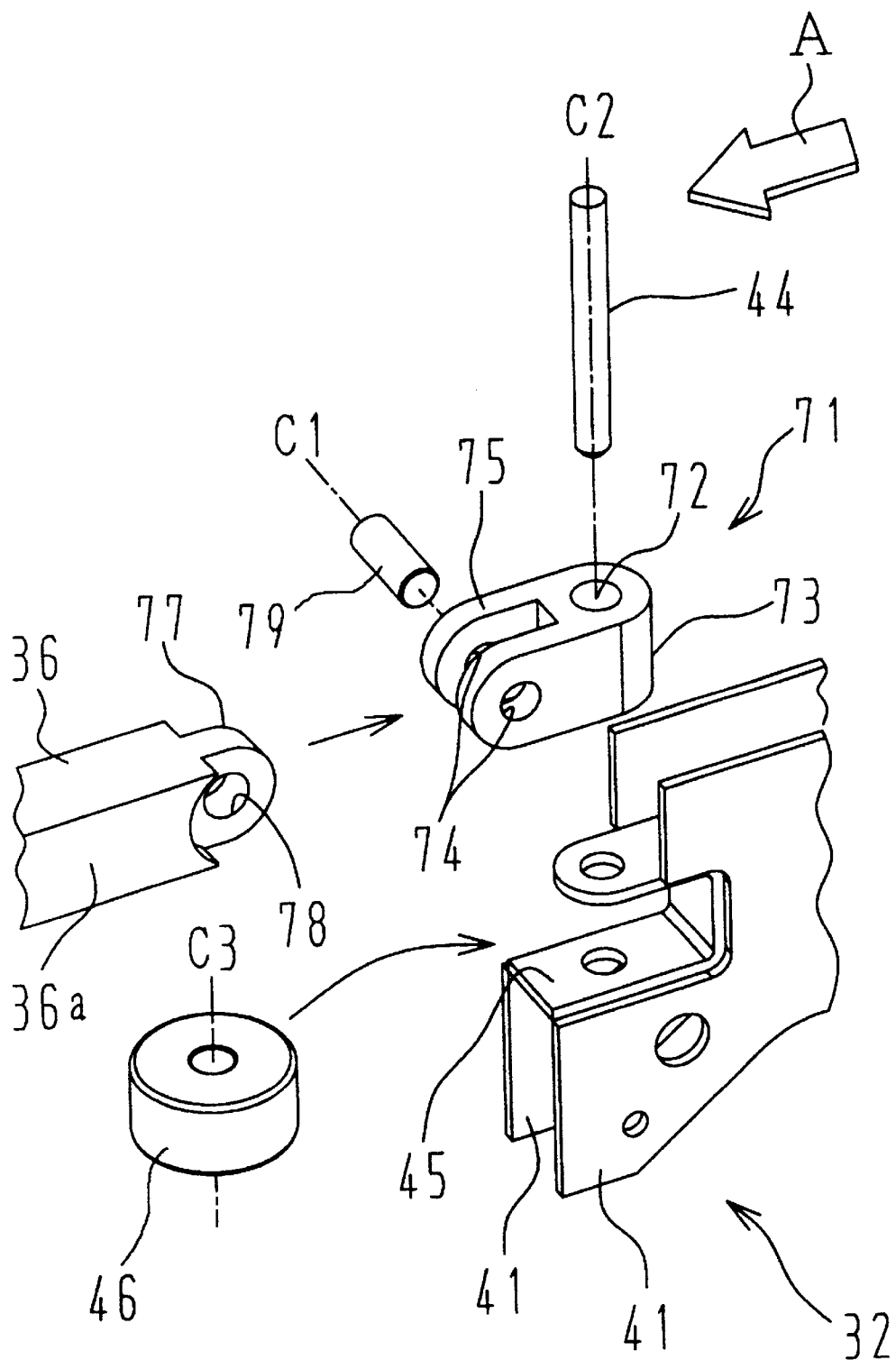
FIG. 6 is an exploded perspective view showing part of FIG. 2 on an enlarged scale.

As shown in detail in FIG. 6, each connecting member 71 comprises a vertical tubular portion 73 held between the front (rear) end portion of the top plate 43 and the front (rear) yoke 45 and having a vertical bore 72 with the roller shaft 44 extending therethrough, and vertical spaced walls 75 extending outward from the outer face of the tubular portion 73 and each having a horizontal hole 74. The horizontal guide roller 46 is held between the upper and lower flanges of the yoke 45 and between the bent edges 22 of the rail members 21.

Each of front and rear horizontal roller shafts 47, orthogonal to the respective front and rear vertical roller shafts 44, is secured to and extends through the opposed side plates 41 with its opposite ends projecting from the plates. A vertical support roller 48 is mounted on each projecting end of the roller shaft 47. The support roller 48 bears on the lower flange of the rail member 21.

Each of the side plates 41 has an outer side surface which is flat and smooth in its entirety. The portion of the outer side surface above the yokes 45 provides a roller bearing face 32a.

Figure 7:
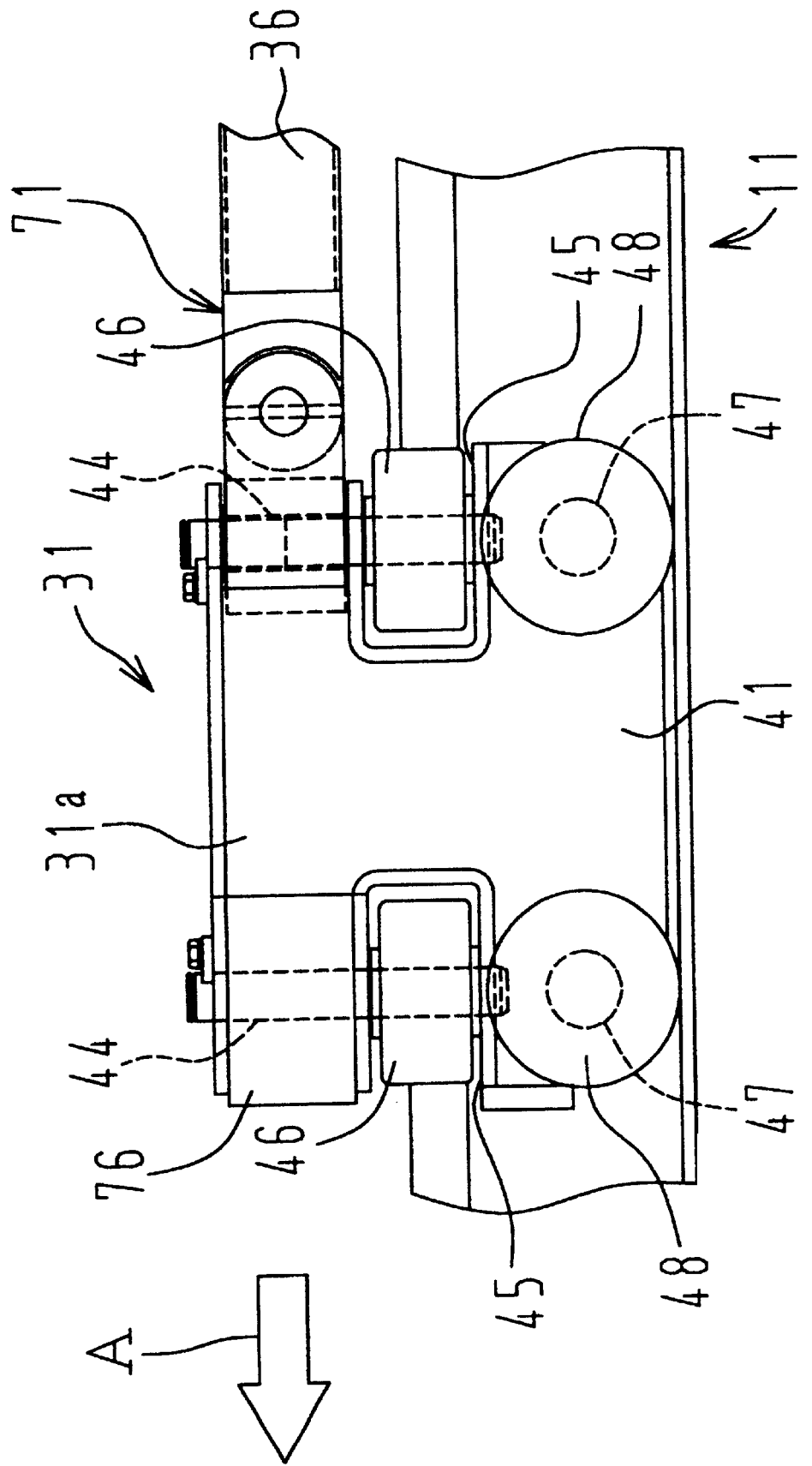
FIG. 7 is a side elevation showing a first trolley of the conveyor and the surroundings thereof.
Figure 8:
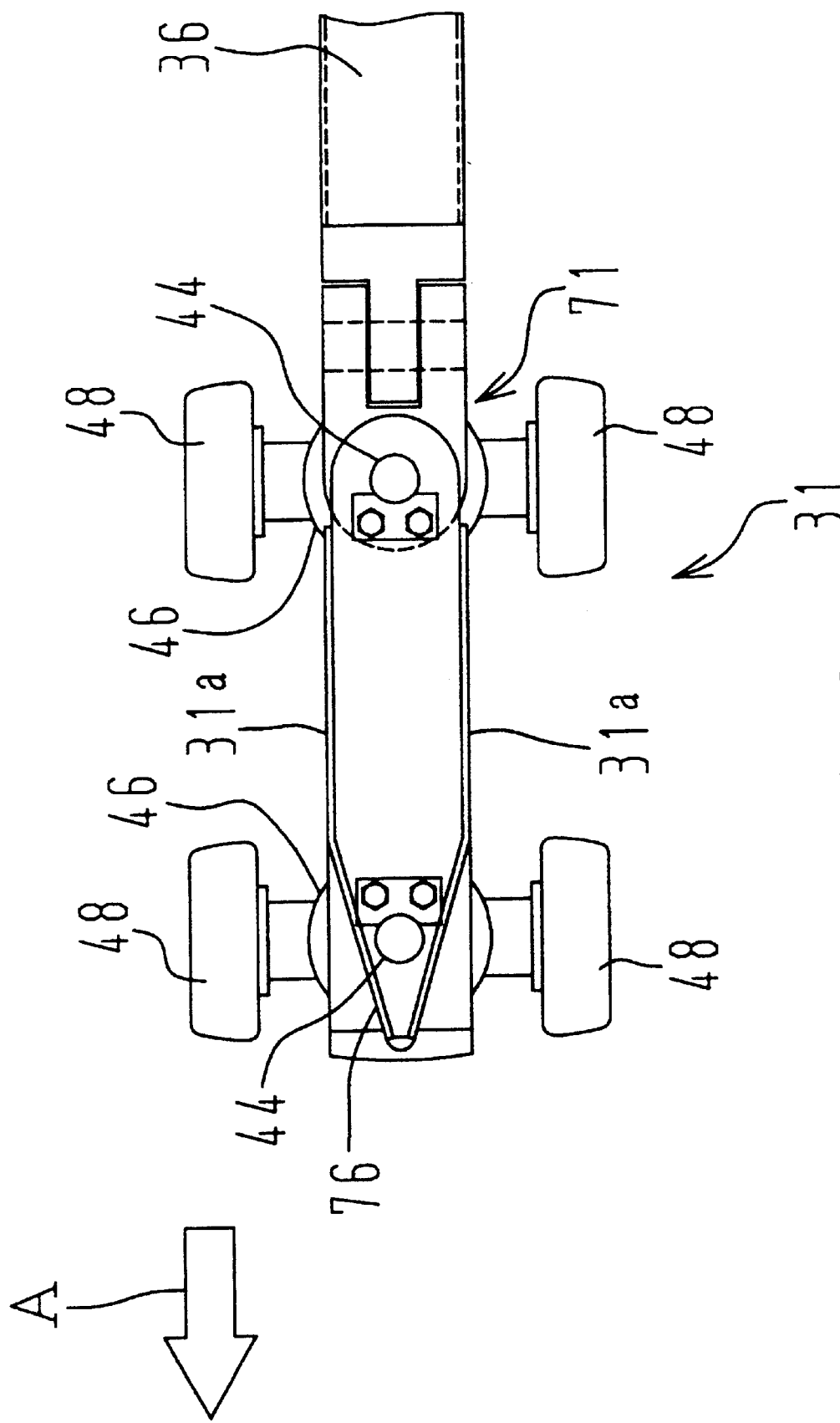
FIG. 8 is a plan view of the same.

FIGS. 7 and 8 show the first trolley 31, which has the same construction as the second trolley 32 except that the first trolley 31 has no guide sleeve 42, with the front connecting member 71 replaced by a head member 76 attached to the front vertical roller shaft 44. The head member 76 has front to opposite side portions which are generally V-shaped when seen from above. Like the second trolley 32, the first trolley 31 has roller bearing faces 31a. The fourth trolley 34 has the same construction as the first trolley 31 except that it is oriented in the opposite direction to the first longitudinally of the conveyor.

Figure 9:
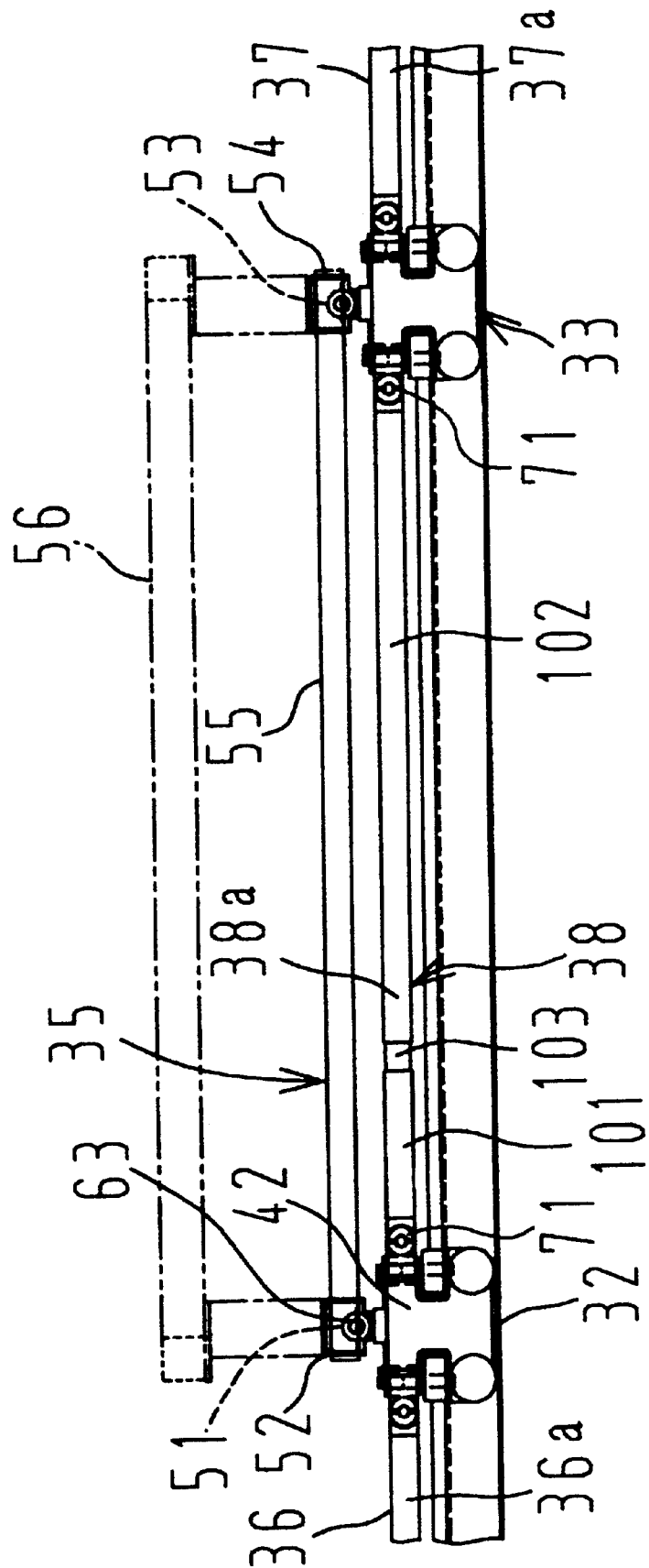
FIG. 9 is a side elevation mainly showing a driven rod of the conveyor.

With reference to FIG. 9, the truck main body 35 comprises a horizontal front lateral member 52 extending leftward and rightward, i.e., transversely of the rail 11, and supported by a front trunnion joint member 51 on the second trolley 32, a horizontal rear lateral member 54 extending transversely of the rail 11 and supported by a rear trunnion joint member 53 on the third trolley 33, a pair of horizontal longitudinal members 55 interconnecting the front and rear lateral members 52, 54 and extending in parallel to each other, and an upper structure 56 mounted on and interconnecting the front and rear lateral members 52, 54.

The front and rear trunnion joint members 51, 53 have the same construction. The front joint member 51 will be described. With reference FIG. 4 chiefly, this member comprises a vertical pivot 61 and a horizontal sleeve 62 orthogonal to the pivot and provided on the upper end thereof. The pivot 61 is slidably fitted in the guide sleeve 42 of the second trolley 32. The horizontal sleeve 62 is attached to the front lateral member 52 at the lengthwise midportion thereof by a horizontal pin 63 slidably fitted in the sleeve 62 and extending transversely of the rail 11 and by brackets 64. In this way, the second trolley 32 and the third trolley 33 are connected to the truck body 35 pivotally movably upward, downward, leftward and rightward.

The first and second driven rods 36, 37 have the same construction and are each in the form of a pipe of square or rectangular cross section. The first driven rod 36 has on each of its opposite sides a roller bearing face 36a connected to the roller bearing face 31a of the first trolley 31 and to the roller bearing face 32a of the second trolley 32 (FIG. 10).

With reference to FIG. 6, the first driven rod 36 is formed at its rear end with an ear 77 in the form of a vertical plate and having a horizontal bore 78. With the ear 77 fitted in between the spaced walls 75 of the connecting member 71 of the second trolley 32, a horizontal pin 79 is inserted in the bore 78 of the ear 77 and the holes 74 of the spaced walls 75, whereby the rear end of the first driven rod 36 and the front end of the second trolley 32 are made pivotally movable upward and downward about a horizontal axis C1 and also pivotally movable leftward and rightward about a vertical axis C2. The vertical axis C2 is in coincidence with the center C3 of rotation of the front guide roller 46.

Referring to FIGS. 7 and 8, the front end of the first driven rod 36, like the rear end thereof, is connected to the rear end of the first trolley 31 by the connecting member 71. Although not shown in detail, the second driven rod 37 has a front end similarly connected to the third trolley 33 and a rear end similarly connected to the fourth trolley 34. Like the first driven rod 36, the second driven rod 37 has roller bearing faces 37a (FIG. 10).

Figure 10:
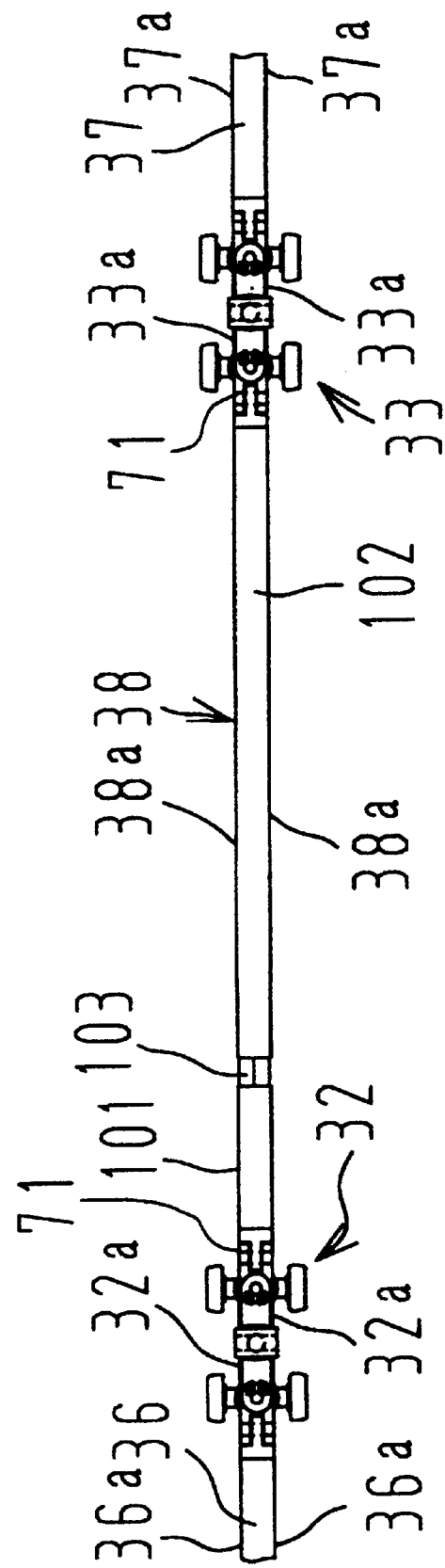
FIG. 10 is a plan view of the part shown in FIG. 9.

The third driven rod 38 is appropriately shown in its entirety in FIGS. 9 and 10. The rod 38, which is in the form of a telescopic pipe, comprises a front outer pipe 101 and a rear outer pipe 102 spaced apart by a predetermined distance as aligned longitudinally of the rail 11 and an inner pipe 103 fitted in and interconnecting these pipes. The front and rear outer pipes 101, 102 each have a square to rectangular cross section of the same size as the first and second driven rods 36, 37, and a roller bearing face 38a connected to the roller bearing faces 36a, 37a of the respective first and second driven rods 36, 37. The inner pipe 103 is fixed to the front outer pipe 101 and slidable within the rear outer pipe 102, whereby the third driven rod 38 is made extensible or contractable longitudinally thereof. The front end of the front outer pipe 101 is connected to the second trolley 32, and the rear end of the rear outer pipe 102 to the third trolley 33, each by a connecting member 71 as in the case of the first and second driven rods 36, 37 although a detailed description will not be given.

FIG. 10 is a plan view of the part of the conveyor shown in FIG. 9 although the truck body 35 is omitted from FIG. 10. It is seen that the conveyor has on each side thereof the roller bearing face 36a of the first driven rod 36, roller bearing face 32a of the second trolley 32, roller bearing face 38a of the third driven rod 38, roller bearing face 33a of the third trolley 33 and roller bearing face 37a of the second driven rod 37 which are substantially flush with one another. Although not shown in FIG. 10, the roller bearing faces of the first and fourth trolleys 31, 34 are also flush with these faces.

Figure 11:
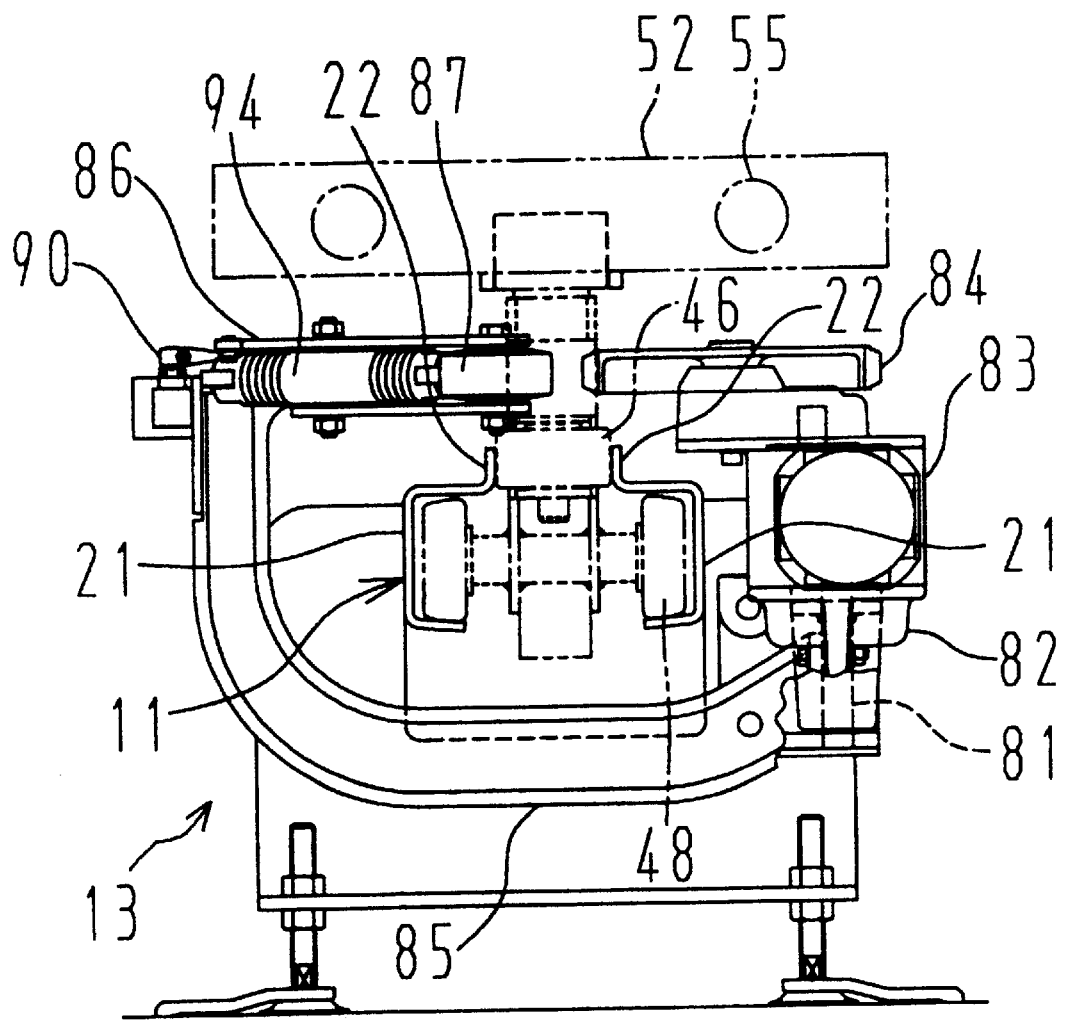
FIG. 11 is a front view of a truck drive device of the conveyor.
Figure 12:
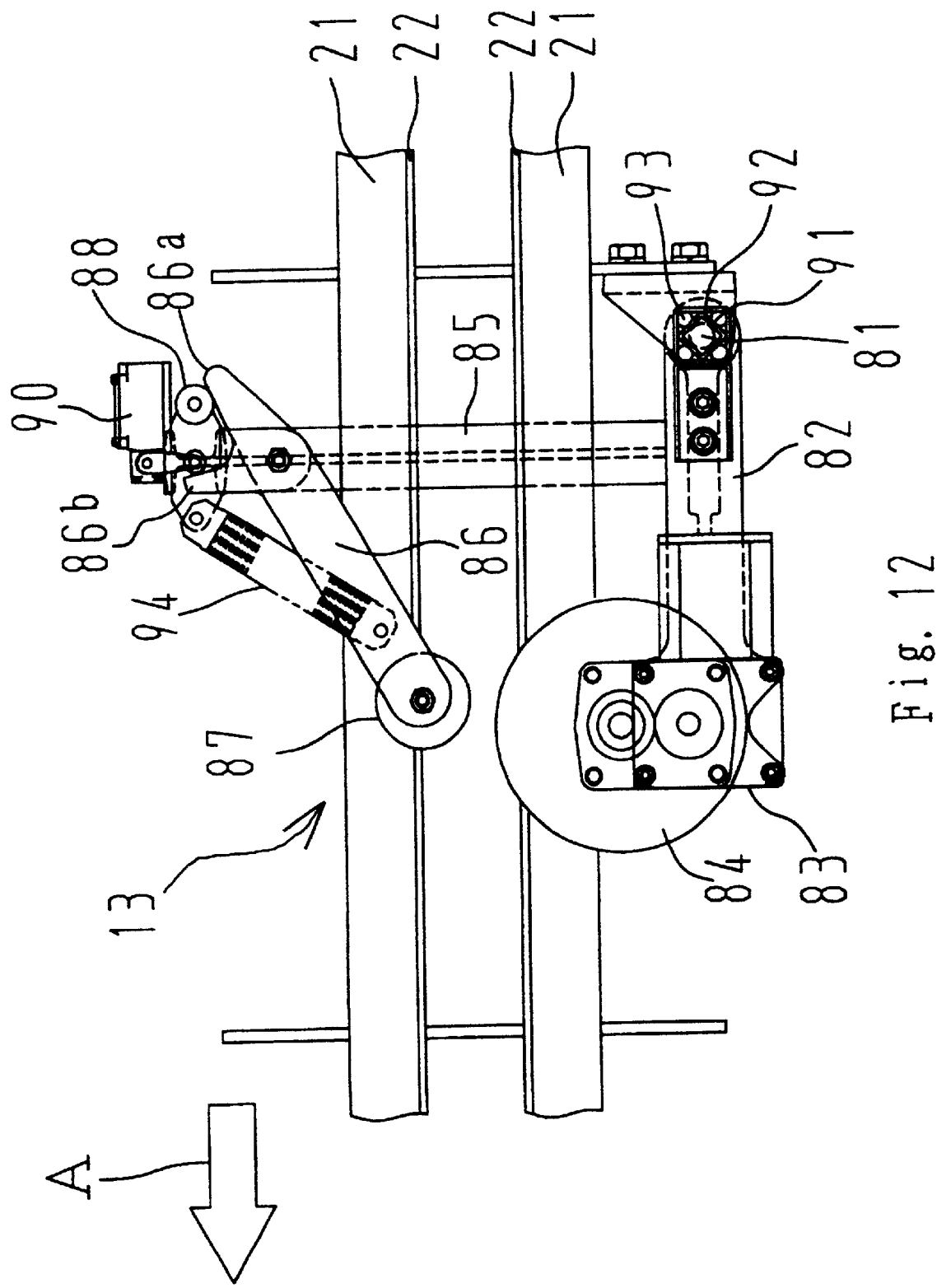
FIG. 12 is a plan view of the truck drive device.
Figure 13:
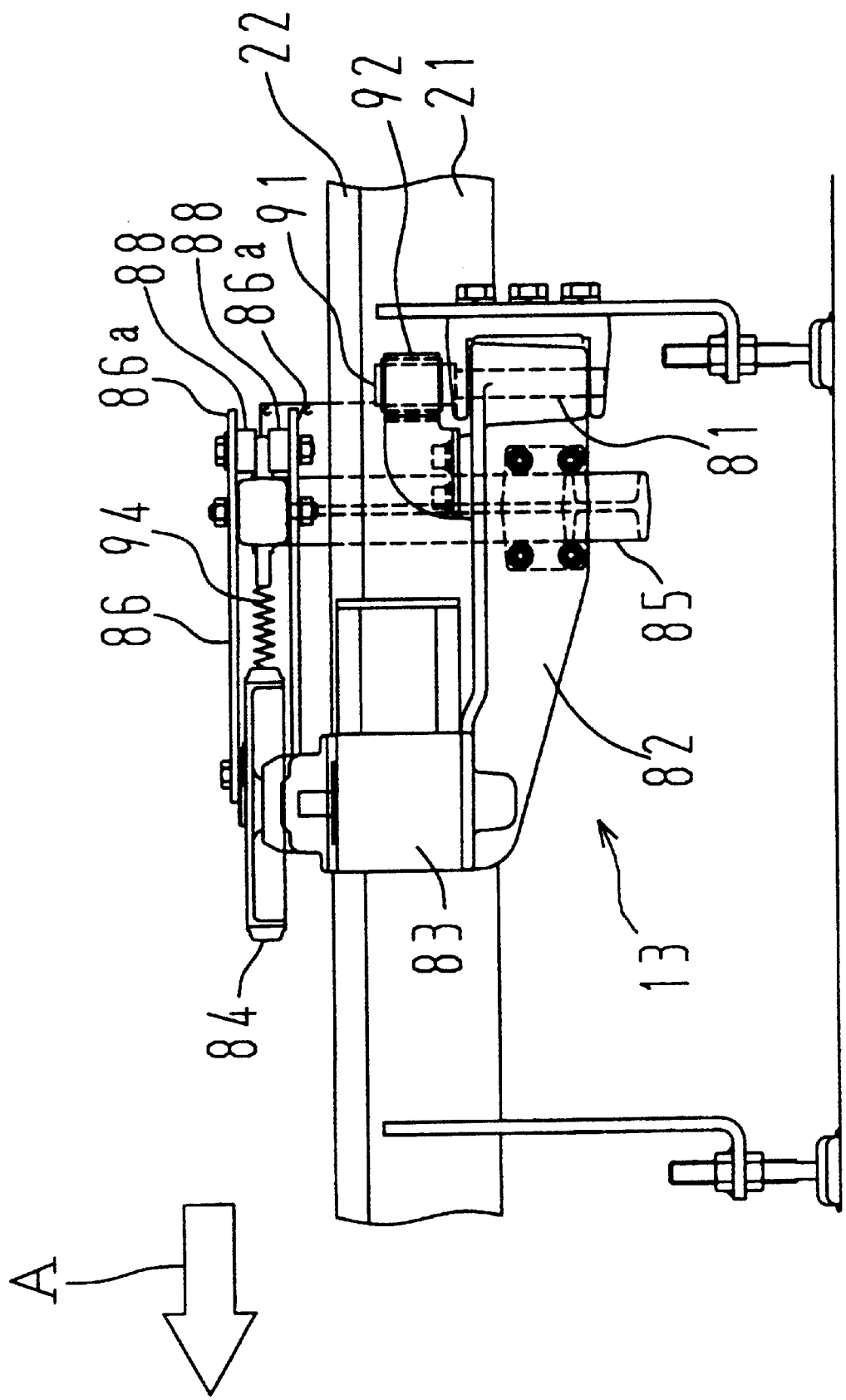
FIG. 13 is a side elevation of the truck drive device.

The truck drive device 13 will be described next with reference to FIGS. 11 to 13. The truck drive device 13 can be provided for both the straight path and the curved path of movement of trucks on the running rail 11.

The truck drive device 13 comprises a vertical support shaft 81 disposed at the right of the rail 11 and fixed by suitable means, a main pivotal arm 82 extending forward and supported by the shaft 81 pivotally movably, a motor 83 mounted on the forward end of the pivotal arm 82 and directed upward, a horizontal drive roller 84 mounted on the rotation shaft of the motor 83, a support arm 85 fixed to the pivotal arm 82 so as to be movable with the arm 82 and extending from the vicinity of the base portion of the pivotal arm 82 downward to below the rail 11 and then upward to the left side of the rail 11, a driven pivotal arm 86 pivoted to the support arm 85 in the vicinity of its free end and movable horizontally relative to the arm 85, and a horizontal holding roller 87 mounted on a forward end of the driven pivotal arm 86 so as to be opposed to the drive roller 84.

The support shaft 81 has an upper portion projecting upward beyond the base portion of the main pivotal arm 82. An inner square pipe 91 is secured to the upward projection of the support shaft 81. An outer square pipe 92 is fitted around the inner square pipe 91, with the diagonals of one of the pipes displaced from those of the other pipe by 45 degrees. Accordingly formed inside the outer pipe 92 around the inner pipe 91 are four interstices each having a triangular contour in horizontal cross section. A cushion 93 in the form of a round bar of elastic material is filled in each interstice. A compression coil spring 94 has one end engaged with the driven pivotal arm 86 at a position close to its forward end, and the other end engaged with the free end of the support arm 85 beyond the pivoted point of the driven pivotal arm 86.

The driven pivotal arm 86 has a base portion bifurcated into a first lug 86a extending in a direction opposite to the arm forward end, and a second lug 86b. The support arm 85 is provided at its free end with a stopper roller 88, permitting the first lug 86a to bear thereon to restrain the driven pivotal arm 86 from moving counterclockwise. A limit switch 90 is also mounted on the free end of the support arm 85. With the first lug 86a in bearing contact with the stopper roller 88, the limit switch 90 has its actuator contacted with the second lug 86b. With the first lug 86a in bearing contact with the stopper roller 88 and with the actuator of the limit switch 90 in bearing contact with the second lug 86b, the holding roller 87 is held spaced apart from the driven roller 84 by a clearance smaller than the distance between the opposite roller bearing faces 38a of the third driven rod 38.

The first trolley 31, when advancing into the clearance between the drive roller 84 and the holding roller 87 during the transport of the truck 12, increases the clearance between the drive roller 84 and the holding roller 87, thereby moving the driven pivotal arm 86 clockwise and pressing the second lug 86b against the actuator of the limit switch 90 to turn on the switch 90, whereby the motor 83 is started up. Upon the truck 12 moving past the drive roller 84 and the holding roller 87 to turn off the limit switch 90, the motor 83 is halted.

When the first trolley 31 advances into the clearance between the drive roller 84 and the holding roller 87, the head member 76 gradually increases the clearance between the rollers 84, 87, consequently permitting the advance of the first trolley 31 without the impact of collision.

Figure 14:
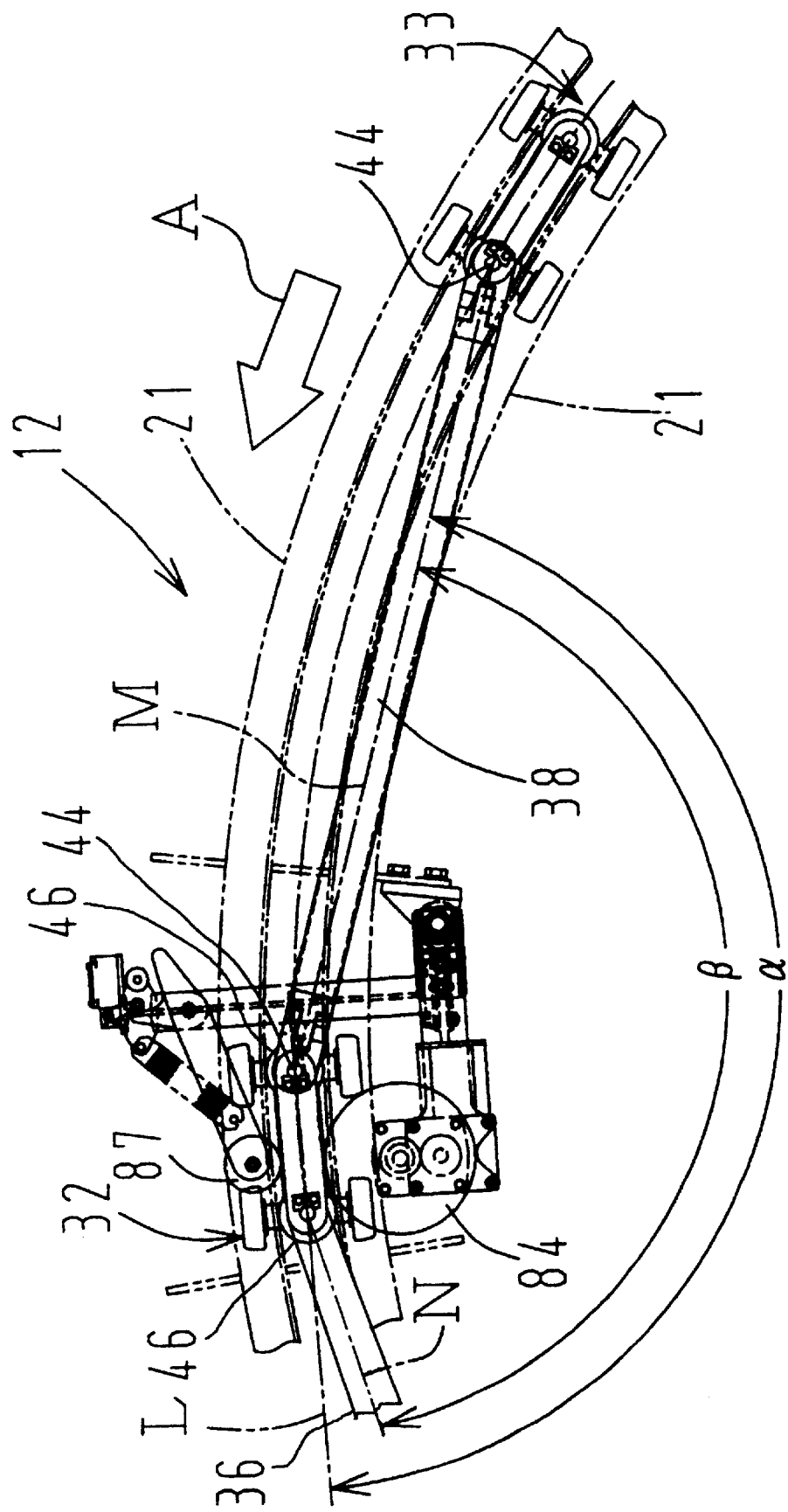
FIG. 14 is a diagram illustrating a truck while it is moving along a curved path of movement.
Figure 15:
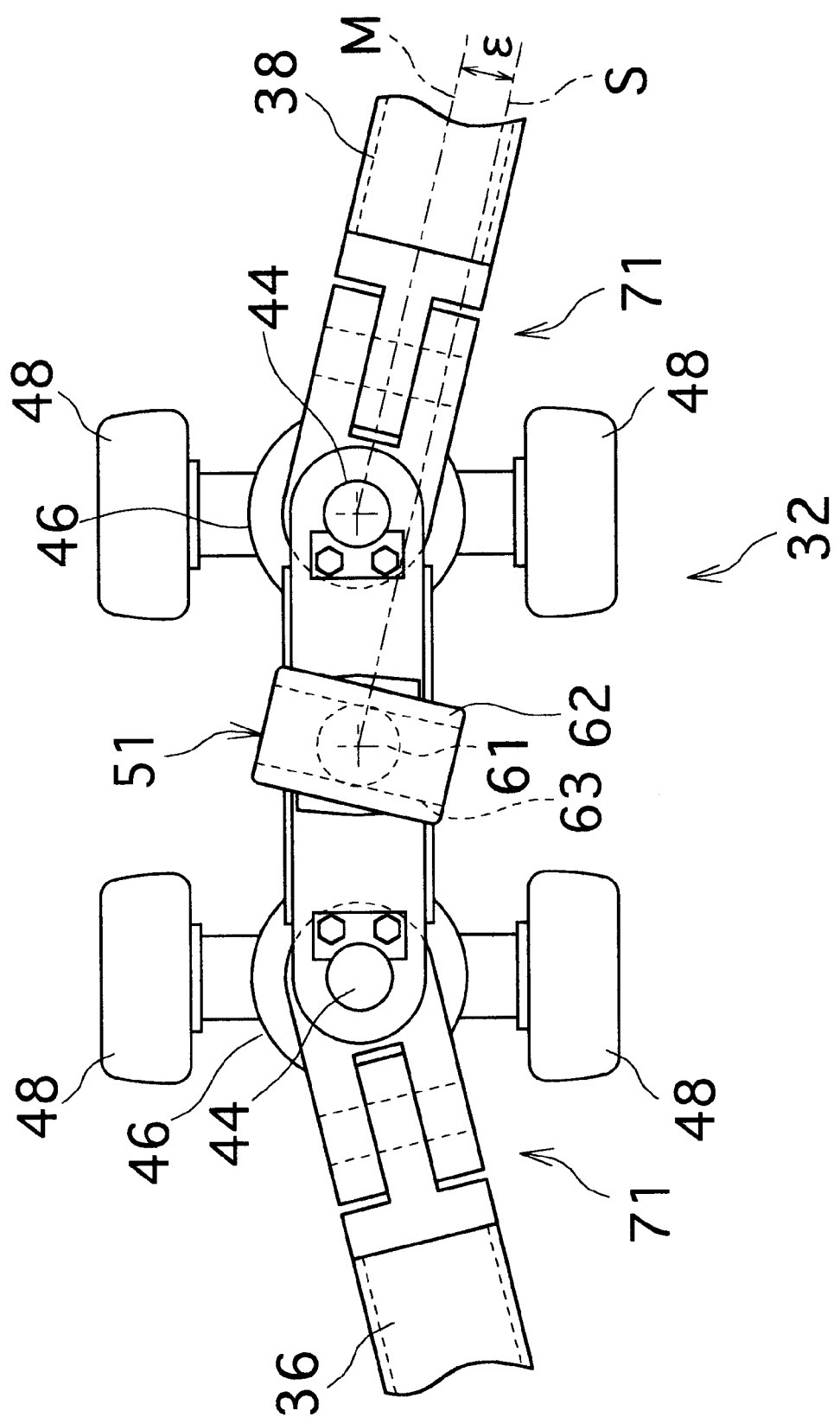
FIG. 15 is a plan view showing part of FIG. 14 on an enlarged scale.

FIG. 14 shows a case wherein while the truck 12 is traveling along a curved path, the second trolley 32 is about to move past the drive roller 84 and the holding roller 87 which have sent out the first driven rod 36 from the space therebetween. The first trolley 31, second driven rod 37 and fourth trolley 34 are omitted from the illustration. FIG. 15 shows part of FIG. 14 on an enlarged scale.

The first driven rod 36 is flexed relative to the second trolley 32 so as to make a great obtuse angle therewith when seen from above about the vertical roller shaft 44 at the front end of the second trolley 32, and the second trolley 32 is flexed relative to the third driven rod 38 about the vertical roller shaft 44 at the rear end of the second trolley 32 so as to make a great obtuse angle therebetween when seen from above. Further the second trolley 32 is similarly flexed relative to the truck body 35 about the vertical pivot 61 of the front trunnion joint 51. Although not shown, on the other hand, the third driven rod 38 is similarly flexed relative to the third trolley 33, and the truck body 35 is similarly flexed relative to the third trolley 33.

With reference to FIG. 15, suppose a line through the center of the truck body 35 is S, and a line through the center of the third driven rod 38 is M. The line M is positioned as deflected from the line S by an amount $\epsilon$ radially outwardly of a variation curve path of movement. The distance between the second trolley 32 and the third trolley 33, i.e., the distance between the vertical pivots 61 of the two trunnion joints 51, is determined by the truck body 35, so that the distance remains the same when the truck travels along the straight path. On the other hand, the length of the third driven rod 38 is longer by an amount corresponding to the amount $\epsilon$ of deflection. This means that the third driven rod 38 is extended.

When the third driven rod 38 moves between the two rollers 84, 87 after the second trolley 32 has been moved past these rollers from the illustrated state, the two rollers 84, 87 are shifted inward so as to be positioned along the line M.

With reference to FIG. 14, suppose the center line L of the second trolley 32 and the center line M of the third driven rod 38 make an angle $\alpha$, and the center line M of the third driven rod 38 and the center line N of the first driven line 36 make an angle $\beta$. Then $\alpha > \beta$. Upon the passage of the second trolley 32 between the location of the rollers 84, 87, the third driven rod 38 is moved in between the two rollers 84, 87 with the angle of $\beta$.

If the third driven rod 38 is fixed to the truck, with the rear end of first driven rod connected directly to the front end of the third driven rod as described in the beginning with reference to the prior art, the two rollers will be moved along the line S. Since the line M is deflected outwardly of the line S, the amount of movement of the rollers 84, 87 increases by an amount corresponding to the deflection $\epsilon$. Further after the first driven rod has been sent out by the two rollers, the third driven rod will be moved in between the two rollers with an angular variation of $\alpha$, hence a disadvantage. This means that the construction of the present invention enables the truck 12 to smoothly move past the drive roller 84 and the holding roller 87.

Furthermore, it is noteworthy that the pivotal center of the connection between rear end of the first driven rod 36 and the front end of the second trolley 32 is in coincidence with the center of rotation of the front guide roller 46. When the front end of the second trolley 32 is pushed sideways by the drive roller 84, the front guide roller 46 collides with the outer rail member 21. Suppose the pivotal center of the connection is not in coincidence with the center of rotation of the front guide roller 46 but is positioned forwardly of the center of rotation as in the prior art. When the front end of the second trolley 32 is pushed sideways by the drive roller 84, the front guide roller 46 collides with the outer rail member 21, and additionally, the second trolley 32 is pivotally moved clockwise in FIG. 14 as supported by the front guide roller 46 by virtue of the principle of the lever and the fulcrum, permitting the rear guide roller 46 to collide with the outer rail member 21. With the present invention, however, the two centers are in coincidence, so that the second trolley 32 quietly moves past the drive roller 84 without being pivotally moved. This is also true of the first trolley 31, third trolley 33 and fourth trolley 34.

Although the present invention has been described above with reference to the embodiment wherein the trolleys are made pivotally movable horizontally, the invention is useful also in the case where the trolleys are made pivotally movable upward and downward.

The embodiment described is a floor conveyor, whereas the invention is applicable also to overhead conveyors.

When the curved path of movement of the truck has a large turning radius, the third driven rod need not always be telescopically extended. A truck so adapted will be described below. Throughout the drawings of the construction already described and the truck to be described, like parts will be designated by like reference numerals for the sake of convenience.

Figure 16:
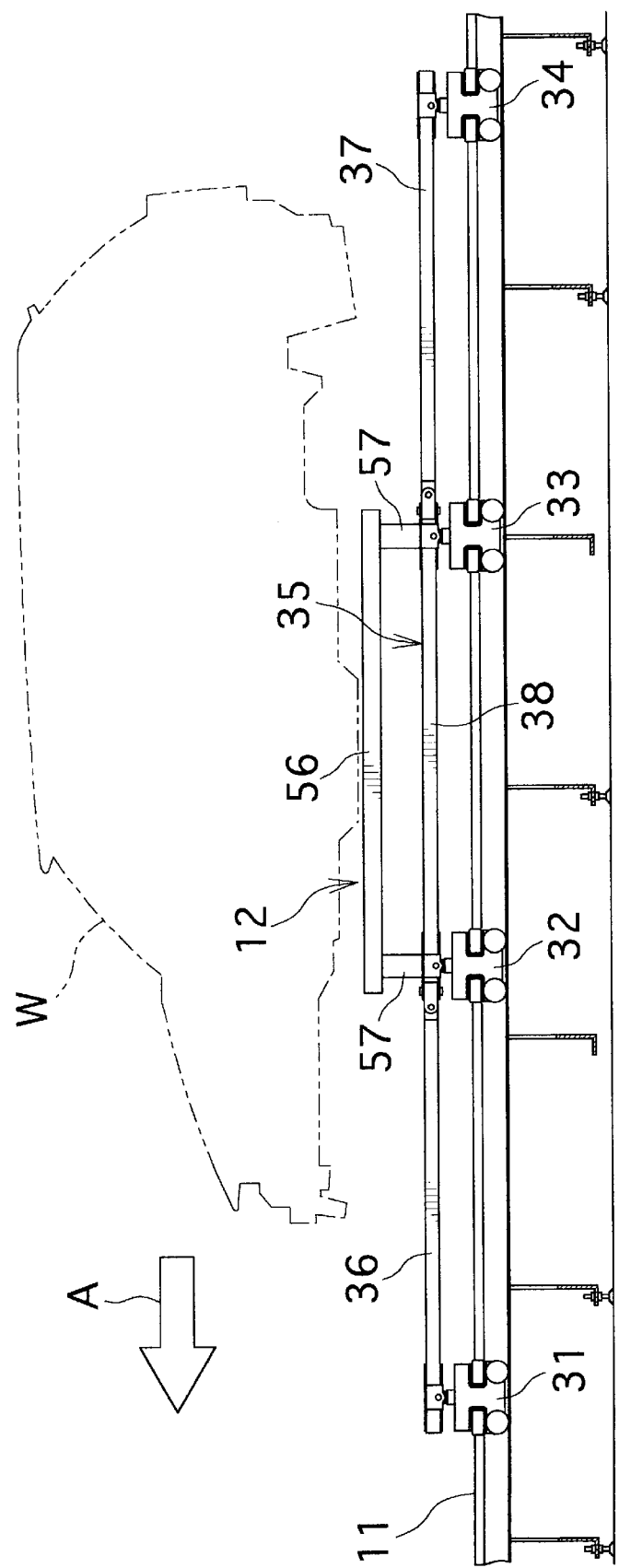
FIG. 16 is a side elevation corresponding to FIG. 1 and showing a modified truck.

With reference to FIG. 16, a truck 12, like the truck already described, comprises first to fourth trolleys 31 to 34, a truck body 35 connected to and extending between second and third trolleys 32, 33, and first to third driven rods 36 to 38.

Figure 17:
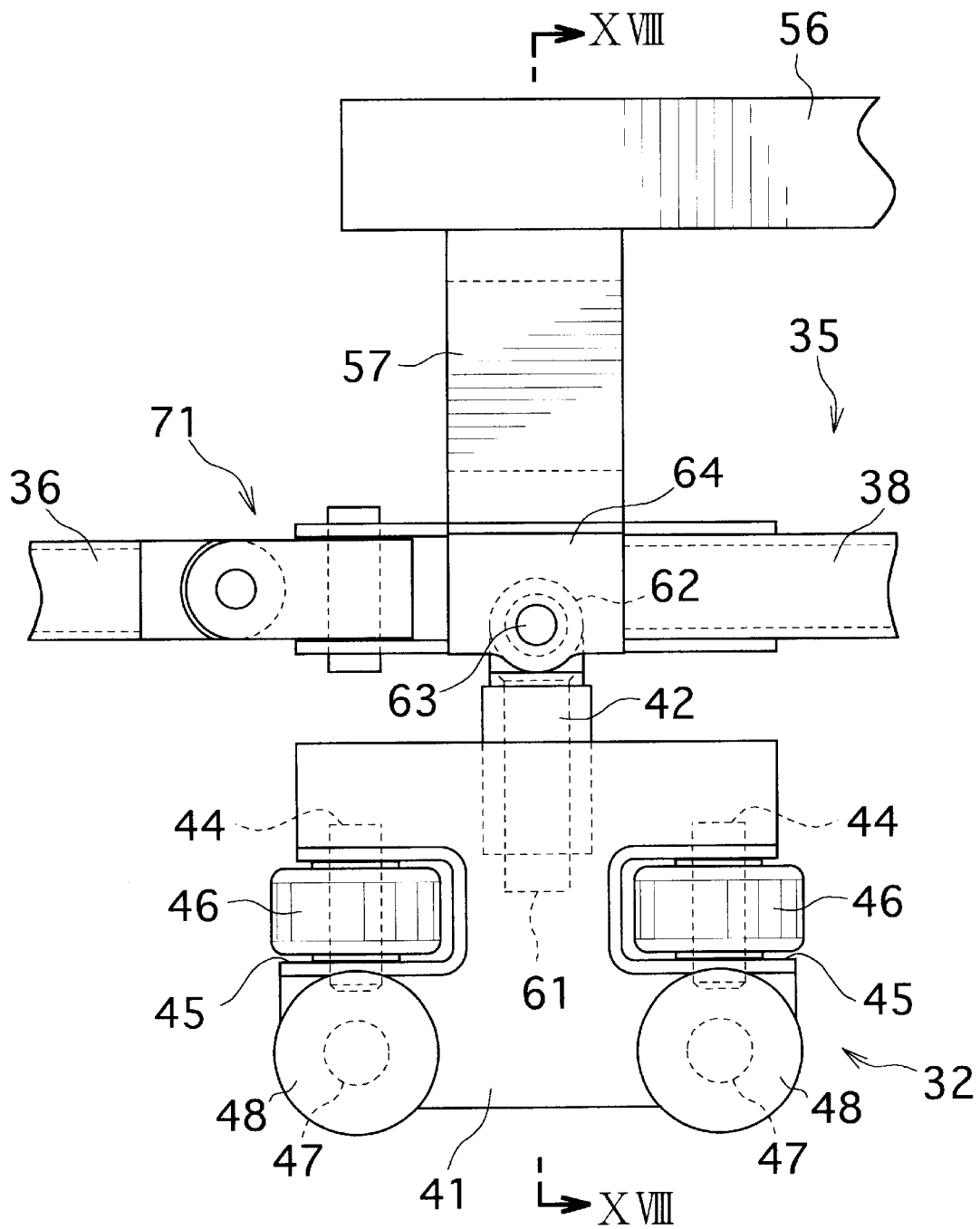
FIG. 17 is a side elevation of a second trolley of the modified truck and the vicinity thereof.
Figure 18:
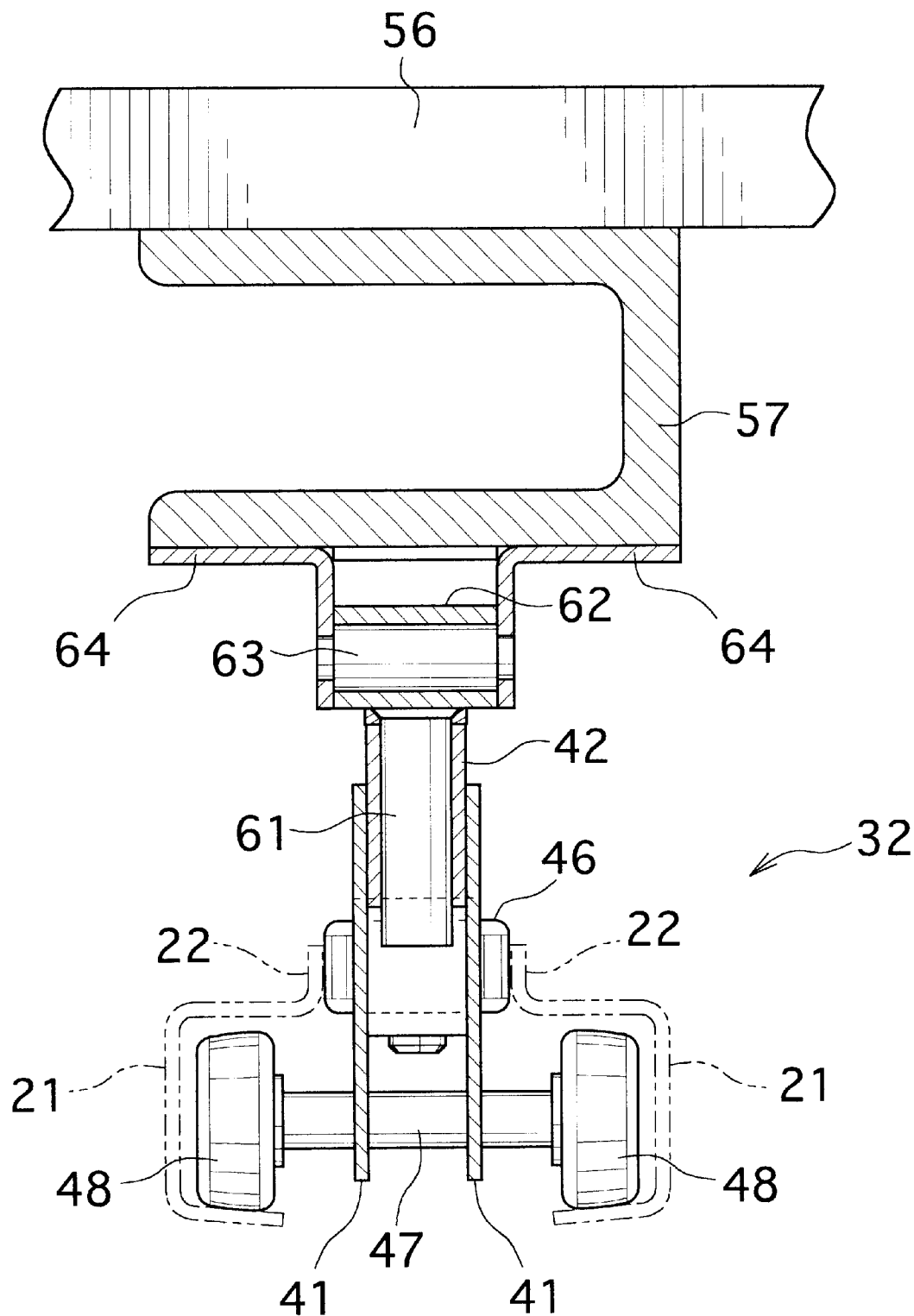
FIG. 18 is a view in section taken vertically along the line XVIII—XVIII in FIG. 17.

FIGS. 17 and 18 show the second trolley 32 and the vicinity thereof. The first driven rod 36 has a rear end removed from the second trolley 32 and connected by a joint member 71 to a front bracket 64 provided between the second trolley 32 and the truck body 35. Similarly, the third driven rod 38 has a front end removed from the second trolley 32 and secured to the front bracket 64. Although not shown in detail, the third driven rod 38 has a rear end secured to a rear bracket 64 provided between the third trolley 33 and the truck body 35.

The truck body 35 has an upper structure 56 which is attached to the front bracket 64 and the rear bracket 64 by U-shaped members 57 used in place of the front and rear lateral members 52, 54 and longitudinal members 55 of the truck described.

Figure 19A:
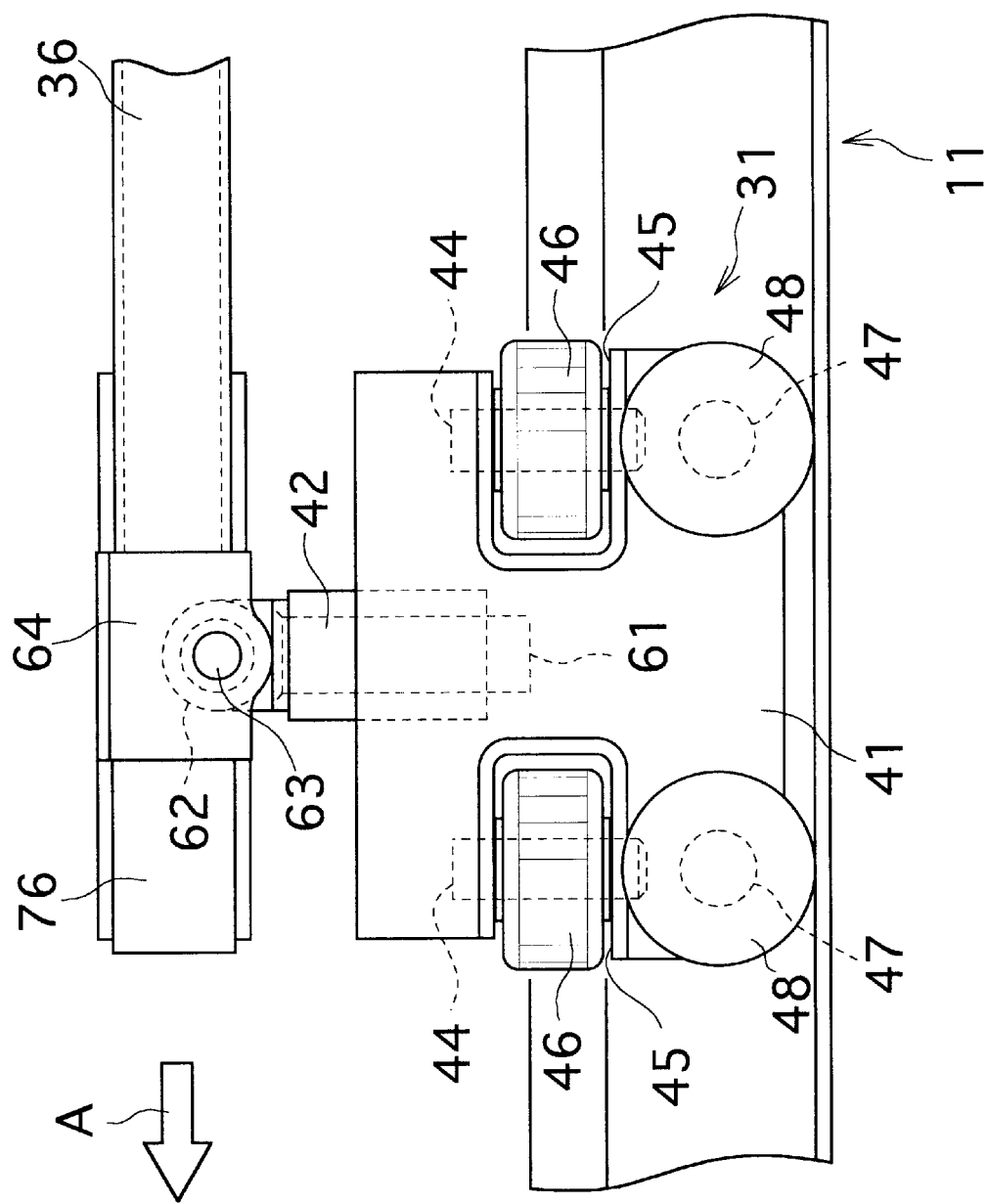
FIG. 19a is a side elevation of a first trolley of the modified truck and the vicinity thereof.

FIG. 19a shows that the first driven rod 36 has its front end connected to a front bracket 64 attached to the first trolley 31 by a trunnion joint 61. Although not shown in detail, it will be imagined that the second driven rod 37 has its front end connected to a rear bracket 64 and its rear end to the fourth trolley 34 in the same manner as the first driven rod 36.

Figure 19B:
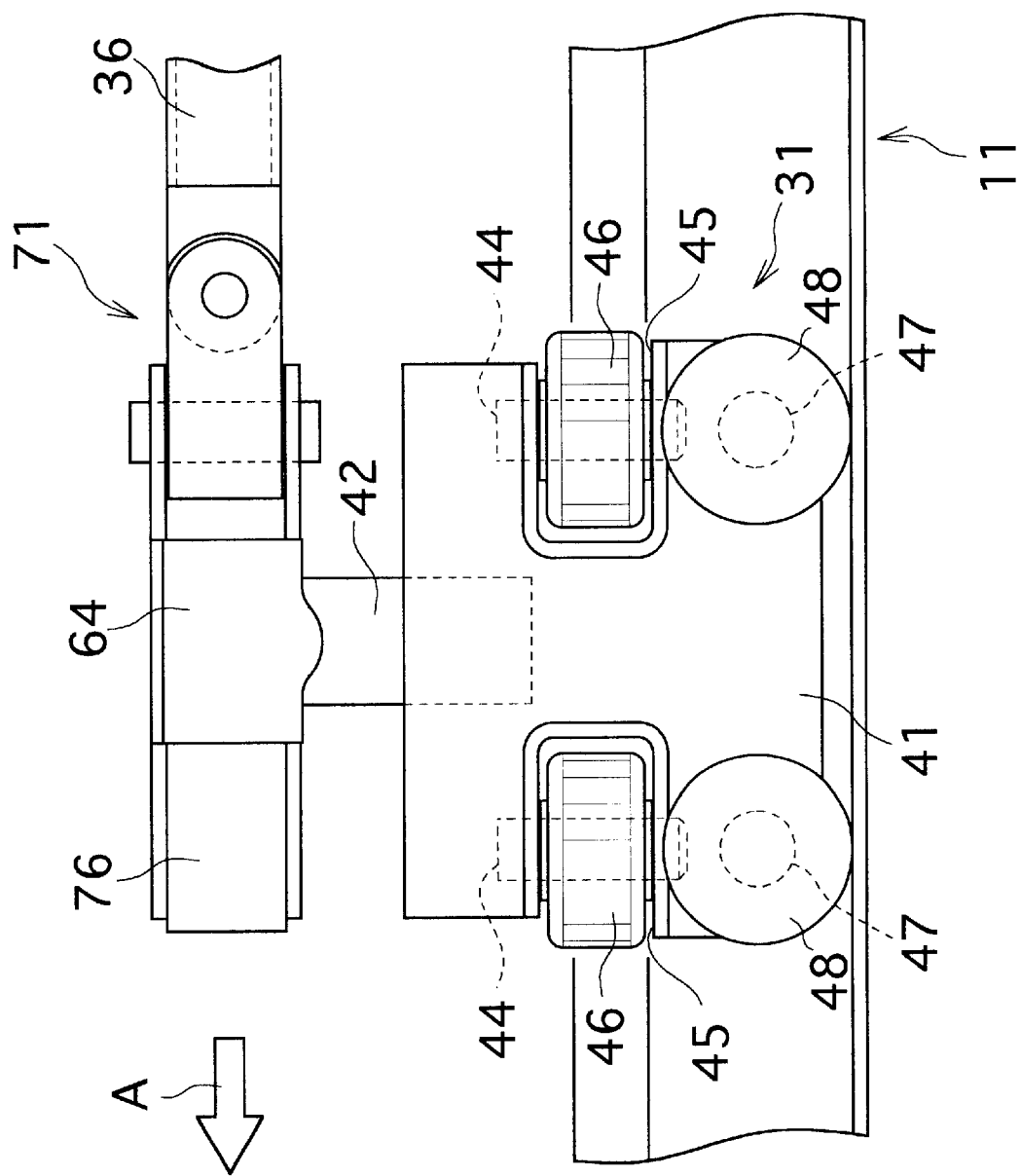
FIG. 19b is a side elevation of another first trolley of the modified truck and the vicinity thereof.

FIG. 19b shows a connection structure, which may be used in place of the connection structure shown in FIG. 19a. In this case, the front bracket 64 is made integral with a guide sleeve 42, and a joint member 71 is used instead of the trunnion joint 61.

Like the truck previously described, the truck thus constructed is traveled on the truck running rail 11 by the truck drive device 13 on the truck running rail 11 regardless of whether the path of movement is straight or curved.

Trucks will be described next which are suitable for transporting small articles.

Figure 20:
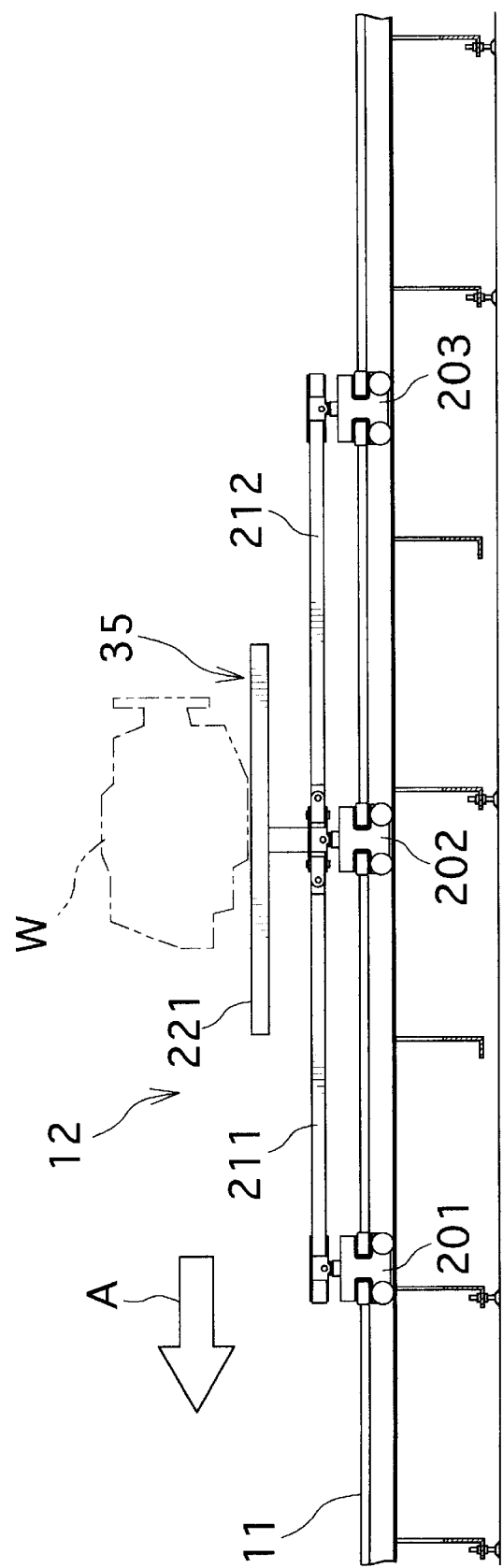
FIG. 20 is a side elevation corresponding to FIG. 1 and showing another modified truck.

More specifically, FIG. 20 shows a truck comprising first to third trolleys 201 to 203, first and second driven rods 211, 212 interconnecting the respective pairs of immediately adjacent trolleys 201 to 203, and a truck body 221 provided on the second trolley 202 and having an article W placed thereon.

Figure 21:
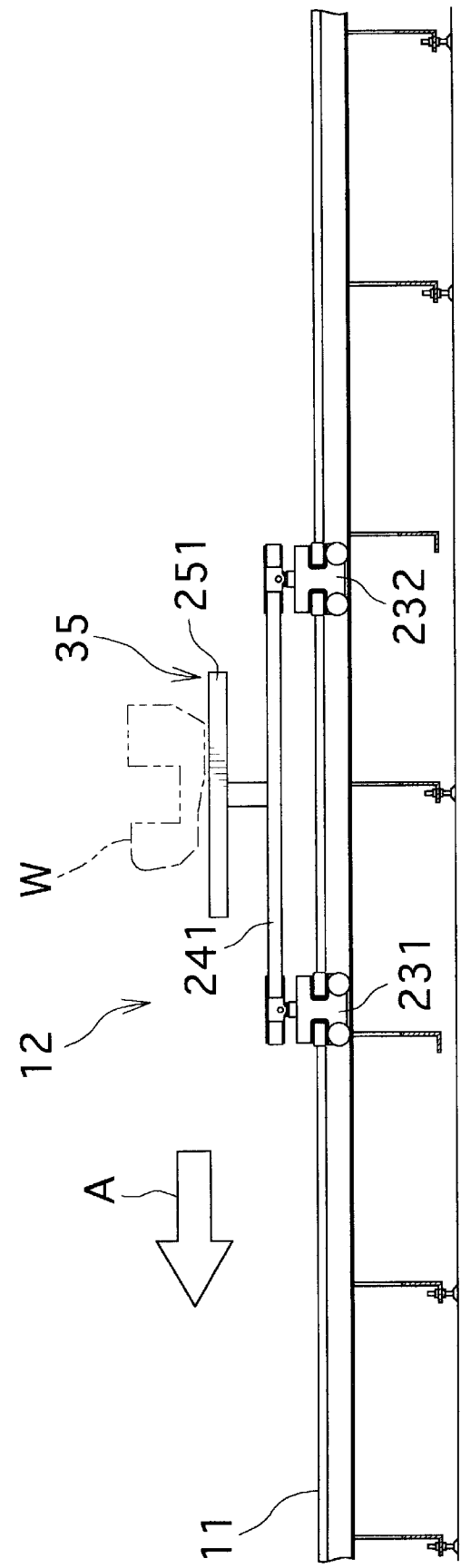
FIG. 21 is a side elevation corresponding to FIG. 1 and showing another modified truck.
Figure 22:
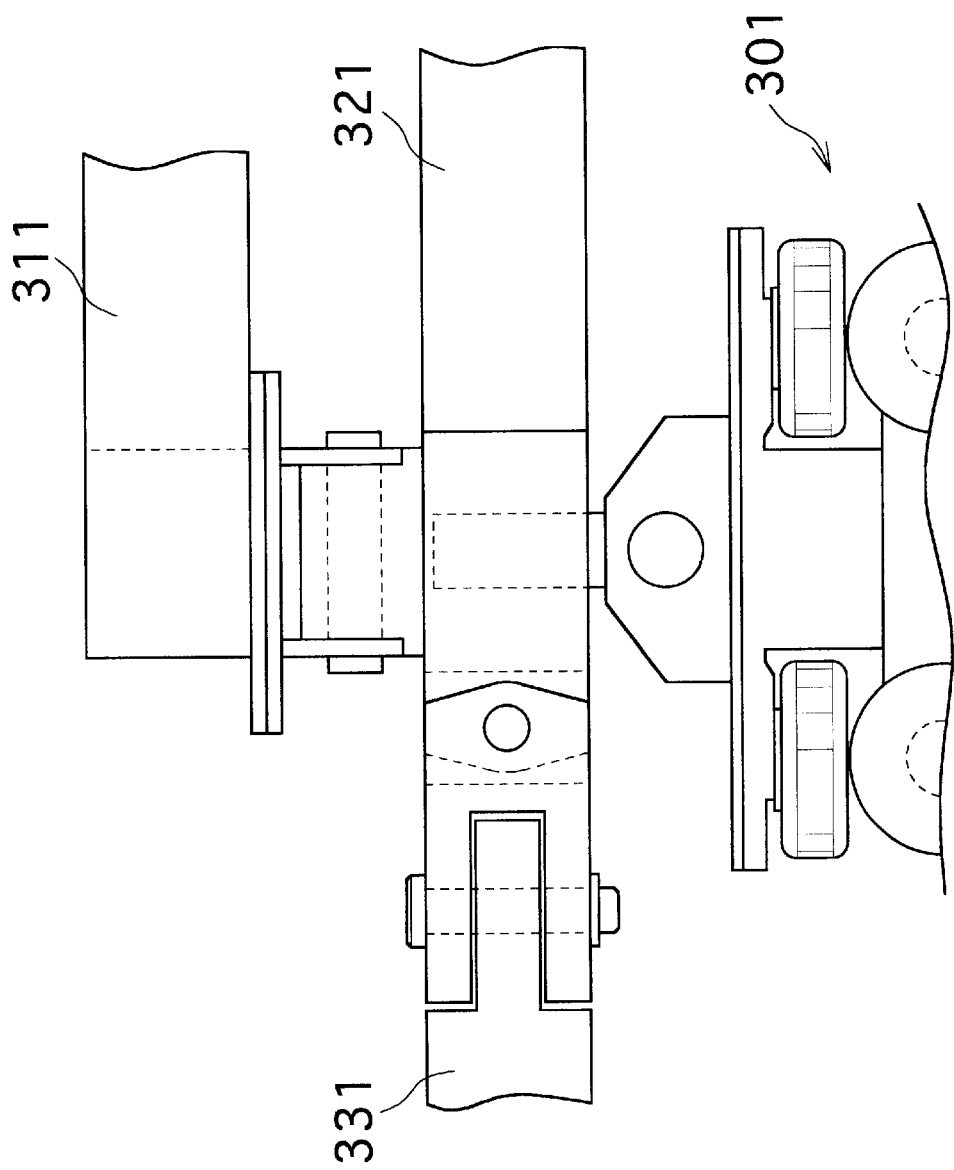
FIG. 22 is a side elevation of a trolley of a conventional apparatus and the vicinity thereof.
Figure 23:
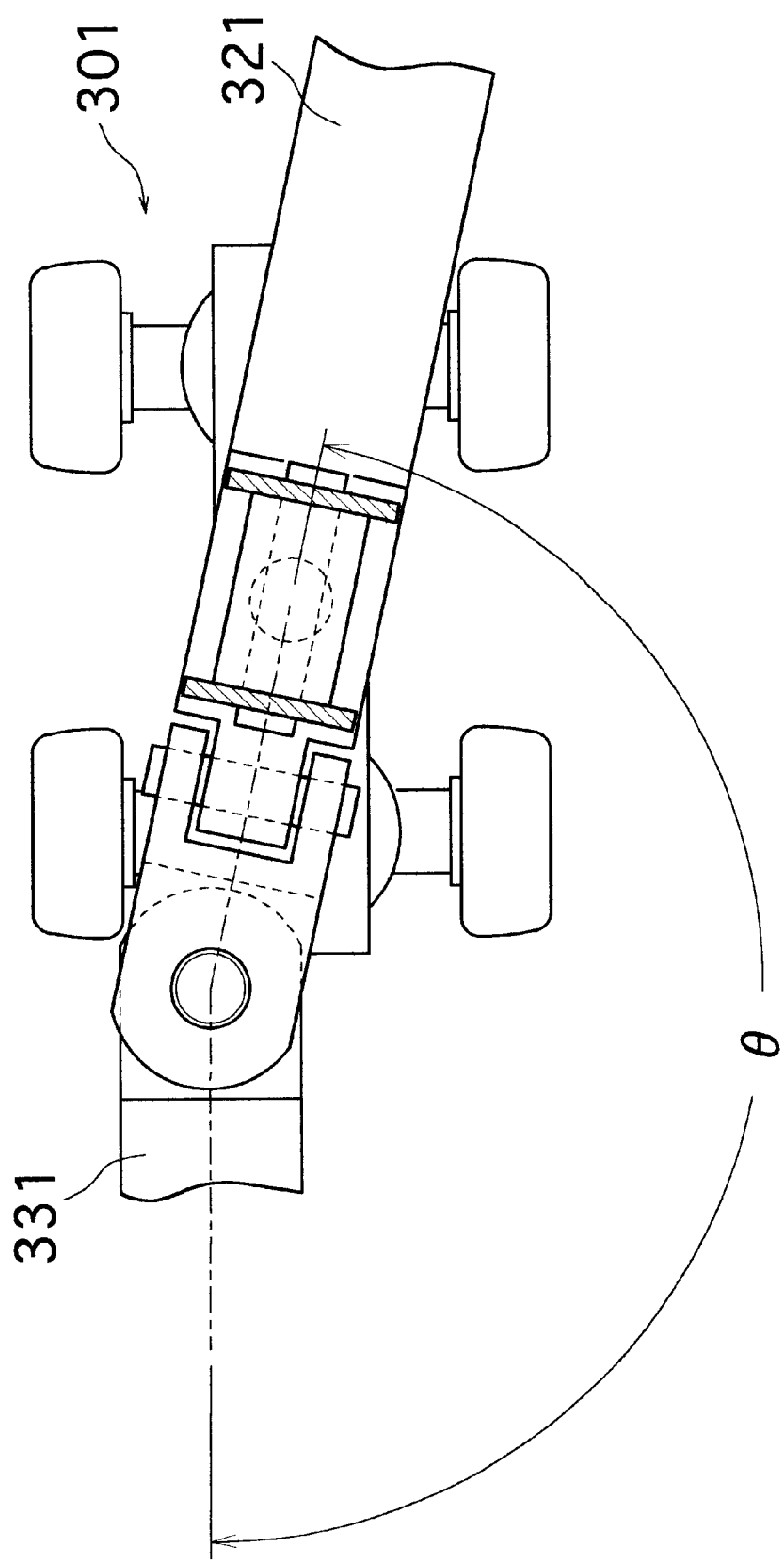
FIG. 23 is a plan view of the portion shown in FIG. 22.

FIG. 21 shows a truck for transporting still smaller articles. The truck comprises first and second trolleys 231, 232, a driven rod 241 interconnecting these trolleys 231, 232, and a truck body 251 provided on the driven rod 241 at the midportion of its length and having an article W placed thereon.

What is claimed is:

1. An apparatus for transporting trucks which comprises a trolley running rail, a front trolley and a rear trolley arranged along the rail in a truck running direction, a truck body connected to the front trolley and the rear trolley at a lengthwise intermediate portion of each trolley so as to permit each trolley to pivotally move horizontally, a driven rod having a front end connected to a rear end of the front trolley so as to make the front trolley free to pivotally move horizontally and a rear end connected to a front end of the rear trolley so as to make the rear trolley free to pivotally move horizontally, and a pair of transport rollers for holding the driven rod therebetween from opposite sides thereof to give the rod a propelling force, the rail having a straight path of movement and a curved path of movement, the driven rod being extensible when the truck is about to move into the curved path from the straight path and contractable when the truck is about to move into the straight path from the curved path.

2. An apparatus for transporting trucks according to claim 1 wherein the rail comprises a pair of guide members extending longitudinally of the rail said guide members being opposed to each other and horizontally spaced apart from each other by a predetermined distance, and a horizontal front guide roller and a horizontal rear guide roller are mounted respectively on front and rear portions of each of the trolleys and held between the guide members, the connection between the front trolley rear end and the driven rod front end having a pivotal center in coincidence with the center of rotation of the rear guide roller of the front trolley, the connection between the rear trolley front end and the driven rod rear end having a pivotal center in coincidence with the center of rotation of the front guide roller of the rear trolley.

3. An apparatus for transporting trucks according to claim 2 wherein a preceding driven rod connected at a front end thereof to a head trolley preceding the front trolley has a rear end connected to a front end of the front trolley so as to make the front trolley free to pivotally move horizontally, and a following driven rod connected at a rear end thereof to a tail trolley following the rear trolley has a front end connected to a rear end of the rear trolley so as to make the rear trolley free to pivotally move horizontally, the connection between the front trolley front end and the preceding driven rod rear end having a pivotal center in coincidence with the center of rotation of the front guide roller of the front trolley, the connection between the rear trolley rear end and the following driven rod front end having a pivotal center in coincidence with the center of rotation of the rear guide roller of the rear trolley, the preceding driven rod and the following driven rod each having opposite side faces joined to respective side faces of the first-mentioned driven rod so as to be flush therewith.

4. An apparatus for transporting trucks according to claim 3 wherein the head trolley is provided at a front end thereof with a head member having a front end face with a generally V-shaped contour in horizontal section.

5. An apparatus for transporting trucks according to claim 1 wherein the first-mentioned driven rod comprises a telescopic pipe.

6. An apparatus for transporting trucks according to claim 1 wherein the pair of transport rollers are arranged on opposite sides of the curved path and supported by a horizontal pivotal body so as to be movable together.

7. An apparatus for transporting trucks according to claim 6 wherein the pair of transport rollers are a drive roller positioned on one side of the curved path and a holding roller positioned on the other side thereof, and the pivotal body comprises a main pivotal arm having the drive roller mounted on a forward end thereof, a support arm fixed at a base end thereof to a lengthwise intermediate portion of the main pivotal arm and extending across the curved path therebelow, and a driven pivotal arm carrying the holding roller at a forward end thereof and pivoted at a base end thereof to a free end of the support arm so as to be horizontally movable relative to the support arm.

8. An apparatus for transporting trucks which comprises a trolley running rail, a front trolley and a rear trolley arranged along the rail in a truck running direction, a truck body connected to the front trolley and the rear trolley at a lengthwise intermediate portion of each trolley so as to permit each trolley to pivotally move horizontally, a driven rod having a front end connected to a rear end of the front trolley so as to make the front trolley free to pivotally move horizontally and a rear end connected to a front end of the rear trolley so as to make the rear trolley free to pivotally move horizontally, and a pair of transport rollers for holding the driven rod therebetween from opposite sides thereof to give the rod a propelling force, the rail having a straight path of movement and a curved path of movement, the driven rod being extensible when the truck is about to move into & the curved path from the straight path and contractible when the truck is about to move into the straight path from the curved path; wherein the pair of transport rollers are arranged on opposite sides of the curved path and supported by a horizontal pivotal body so as to be movable together, the pair of transport rollers are a drive roller positioned on one side of the curved path and a holding roller positioned on the other side thereof, and the pivotal body comprises a main pivotal arm having the drive roller mounted on a forward end thereof, a support arm fixed at a base end thereof to a lengthwise intermediate portion of the main pivotal arm and extending across the curved path therebelow, and a driven pivotal arm carrying the holding roller at a forward end thereof and pivoted at a base end thereof to a free end of the support arm so as to be horizontally movable relative to the support arm, and a vertical outer square pipe is secured to a base end of the main pivotal arm, and a vertical inner square pipe is fitted in the outer square pipe so as to be horizontally movable, the outer pipe being packed with an elastic material around the inner pipe so that the diagonals of one of the pipes are displaced from those of the other pipe by 45 degrees.

9. An apparatus for transporting trucks according to claim 8 wherein a spring is attached to and extends between the support arm and the driven pivotal arm for biasing the driven arm in a direction to move the holding roller toward the drive roller.

10. An apparatus for transporting trucks which comprises a trolley running rail, a front trolley and a rear trolley arranged along the rail in a truck running direction, a driven rod having a front end connected to the front trolley and a rear end connected to the rear trolley, and a pair of transport rollers for holding the driven rod therebetween from opposite sides thereof to give the rod a propelling force, the rail having a path of movement of the trucks, the pair of transport rollers being arranged on opposite sides of the path of movement of the trucks and supported by a horizontal pivotal body so as be movable together, wherein the path of movement of the trucks has a curved path of movement provided with the pair of transport rollers on opposite sides thereof.

11. An apparatus for transporting trucks according to claim 10 wherein the pair of transport rollers are a drive roller positioned on one side of the curved path and a holding roller positioned on the other side thereof, and the pivotal body comprises a main pivotal arm having the drive roller mounted on a forward end thereof, a support arm fixed at a base end thereof to a lengthwise intermediate portion of the main pivotal arm and extending across the curved path therebelow, and a driven pivotal arm carrying the holding roller at a forward end thereof and pivoted at a base end thereof to a free end of the support arm so as to be horizontally movable relative to the support arm.

12. An apparatus for transporting trucks which comprises a trolley running rail, a front trolley and a rear trolley arranged along the rail in a truck running direction, a driven rod having a front end connected to the front trolley and a rear end connected to the rear trolley, and a pair of transport rollers for holding the driven rod therebetween from opposite sides thereof to give the rod a propelling force, the rail having a path of movement of trucks, the pair of transport rollers being arranged on opposite sides of the path of movement of the trucks and supported by a horizontal pivotal body so as be movable together, wherein the pair of transport rollers are a drive roller positioned on one side of the path of movement of the trucks and a holding roller positioned on the other side thereof, and the pivotal body comprises a main pivotal arm having the drive roller mounted on a forward end thereof, a support arm fixed at a base end thereof to a lengthwise intermediate portion of the main pivotal arm and extending across the path of movement of the trucks therebelow, and a driven pivotal arm carrying the holding roller at a forward end thereof and pivoted at a base end thereof to a free end of the support arm so as to be horizontally movable relative to the support arm.

13. An apparatus for transporting trucks according to any one of the claims 10 to 12 wherein a truck body is supported by at least one of the front trolley and the rear trolley.

14. An apparatus for transporting trucks according to any one of the claims 10 to 12 wherein a truck body is supported by the driven rod.

15. An apparatus for transporting trucks which comprises a trolley running rail, a front trolley and a rear trolley arranged along the rail in a truck running direction, a driven rod having a front end connected to the front trolley and a rear end connected to the rear trolley, and a pair of transport rollers for holding the driven rod therebetween from opposite sides thereof to give the rod a propelling force, the rail having a path of movement of trucks, the pair of transport rollers being arranged on opposite sides of the path of movement of trucks and supported by a horizontal pivotal body so as to be movable together; wherein the pair of transport rollers are a drive roller positioned on one side of the path of movement of trucks and a holding roller positioned on the other side thereof, and the pivotal body comprises a main pivotal arm having the drive roller mounted on a forward end thereof, a support arm fixed at a base end thereof to a lengthwise intermediate portion of the main pivotal arm and extending across the path of movement of trucks therebelow, and a driven pivotal arm carrying the holding roller at a forward end thereof and pivoted at a base end thereof to a free end of the support arm so as to be horizontally movable relative to the support arm; and a vertical outer square pipe is secured to a base end of the main pivotal arm, and a vertical inner square pipe is fitted in the outer square pipe so as to be horizontally movable, the outer pipe being packed with an elastic material around the inner pipe so that the diagonals of one of the pipes are displaced from those of the other pipe by 45 degrees.

16. An apparatus for transporting trucks according to claim 15 wherein a spring is attached to and extends between the support arm and the driven pivotal arm for biasing the driven arm in a direction to move the holding roller toward the drive roller.

17. An apparatus for transporting trucks according to claim 15 or 16 wherein a truck body is supported by at least one of the front trolley and the rear trolley.

18. An apparatus for transporting trucks according to claim 17 wherein the truck body is connected to the front trolley and the rear trolley at a lengthwise intermediate portion of each trolley so as to permit each trolley to pivotally move horizontally.

19. An apparatus for transporting trucks according to claim 15 or 16 wherein a truck body is supported by the driven rod.

* * * * *